US007003661B2

(12) United States Patent
Beattie et al.

(10) Patent No.: US 7,003,661 B2
(45) Date of Patent: Feb. 21, 2006

(54) METHODS AND SYSTEMS FOR AUTOMATED AUTHENTICATION, PROCESSING AND ISSUANCE OF DIGITAL CERTIFICATES

(75) Inventors: Douglas D. Beattie, Sudbury, MA (US); Neal Lewis Creighton, Jr., Wellesley Hills, MA (US); Christopher T. M. Bailey, Atlanta, GA (US); David L. Remy, West Linn, OR (US); Hani Hamandi, Beirut (LB)

(73) Assignee: Geotrust, Inc., Needham, MA (US)

( * ) Notice: Subject to any disclaimer, the term of this patent is extended or adjusted under 35 U.S.C. 154(b) by 276 days.

(21) Appl. No.: 10/271,255

(22) Filed: Oct. 15, 2002

(65) Prior Publication Data

US 2003/0126431 A1 Jul. 3, 2003

Related U.S. Application Data

(60) Provisional application No. 60/328,766, filed on Oct. 12, 2001.

(51) Int. Cl.
    *H04L 9/00* (2006.01)
(52) U.S. Cl. ...................................................... 713/156
(58) Field of Classification Search ................. 713/156
    See application file for complete search history.

(56) References Cited

U.S. PATENT DOCUMENTS

| 5,623,600 | A | 4/1997 | Ji et al. |
|---|---|---|---|
| 5,630,066 | A | 5/1997 | Gosling |
| 5,802,518 | A | 9/1998 | Karaev et al. |
| 5,855,020 | A | 12/1998 | Kirsch |
| 5,864,667 | A | 1/1999 | Barkan |
| 5,867,651 | A | 2/1999 | Dan et al. |
| 5,875,440 | A | 2/1999 | Cooperman et al. |
| 5,894,554 | A | 4/1999 | Lowery et al. |
| 5,895,470 | A | 4/1999 | Pirolli et al. |
| 5,896,533 | A | 4/1999 | Ramos et al. |
| 5,903,882 | A | 5/1999 | Asay et al. |
| 5,935,207 | A | 8/1999 | Logue et al. |
| 5,961,591 | A | 10/1999 | Jones et al. |
| 5,982,898 | A | 11/1999 | Hsu et al. |
| 5,983,348 | A | 11/1999 | Ji |

(Continued)

FOREIGN PATENT DOCUMENTS

GB          2 259 590          3/1993

(Continued)

OTHER PUBLICATIONS

Alfred J. Menezes et al., Handbook of Applied Cryptography, 1997, CRC Press, pp. 559-561.*

(Continued)

*Primary Examiner*—Gregory Morse
*Assistant Examiner*—Jacob Lipman
(74) *Attorney, Agent, or Firm*—Wilmer Cutler Pickering Hale and Dorr LLP

(57) ABSTRACT

In a computer system and process for automated identification, processing and issuance of digital certificates, web server domain-control vetting is employed in issuance of server certificates. A Requestor requests a web server certificate from a certificate authority, the certificate authority receives the request. Based on domain information the certificate authority generates Approver email addresses, and the Requestor is required to select an Approver email address or addresses. The certificate authority contacts the Approver using the selected email address or addresses and requests that the Approver approve issuance of the certificate. If approved, the certificate authority accepts the request, and creates and signs the certificate and the signed certificate is sent to the Requestor.

26 Claims, 38 Drawing Sheets

U.S. PATENT DOCUMENTS

| | | | |
|---|---|---|---|
| 6,018,724 | A | 1/2000 | Arent |
| 6,018,801 | A | 1/2000 | Palage et al. |
| 6,026,166 | A | 2/2000 | Lebourgeois |
| 6,035,402 | A * | 3/2000 | Vaeth et al. ............ 713/201 |
| 6,044,462 | A | 3/2000 | Zueldia et al. |
| 6,058,383 | A | 5/2000 | Narasimhalu et al. |
| 6,065,055 | A | 5/2000 | Hughes et al. |
| 6,131,162 | A | 10/2000 | Yoshiura et al. |
| 6,134,658 | A | 10/2000 | Multerer et al. |
| 6,154,844 | A | 11/2000 | Touboul et al. |
| 6,157,930 | A | 12/2000 | Ballard et al. |
| 6,199,052 | B1 | 3/2001 | Mitty et al. |
| 6,209,029 | B1 | 3/2001 | Epstein et al. |
| 6,226,624 | B1 | 5/2001 | Watson et al. |
| 6,233,618 | B1 | 5/2001 | Shannon |
| 6,236,978 | B1 | 5/2001 | Tuzhilin |
| 6,247,007 | B1 | 6/2001 | Cooperman et al. |
| 6,247,133 | B1 | 6/2001 | Palage et al. |
| 6,275,941 | B1 | 8/2001 | Saito et al. |
| 6,301,658 | B1 | 10/2001 | Koehler |
| 6,327,656 | B1 | 12/2001 | Zabetian |
| 6,351,812 | B1 | 2/2002 | Datar et al. |
| 6,357,010 | B1 | 3/2002 | Viets et al. |
| 6,442,689 | B1 | 8/2002 | Kocher |
| 6,499,105 | B1 | 12/2002 | Yoshiura et al. |
| 2001/0042050 | A1 | 11/2001 | Fletcher et al. |
| 2002/0032665 | A1 | 3/2002 | Creighton et al. |
| 2002/0035686 | A1 | 3/2002 | Creighton et al. |
| 2002/0059364 | A1 | 5/2002 | Coulthad et al. |
| 2003/0023878 | A1 | 1/2003 | Rosenberg et al. |
| 2003/0126431 | A1 | 7/2003 | Beattie et al. |

FOREIGN PATENT DOCUMENTS

| | | |
|---|---|---|
| GB | 2 308 688 | 7/1997 |
| WO | WO 97/43717 A | 11/1997 |
| WO | WO 97/50036 | 12/1997 |
| WO | WO 99/30218 | 6/1999 |
| WO | WO 00/46681 | 8/2000 |
| WO | WO 02/06932 | 1/2002 |
| WO | WO 02/07377 | 1/2002 |
| WO | WO 02/073364 | 9/2002 |
| WO | WO 02/077793 | 10/2002 |
| WO | WO 02/077831 | 10/2002 |
| WO | WO 02/078259 | 10/2002 |
| WO | WO 02/082716 | 10/2002 |
| WO | WO 03/032572 | 4/2003 |

OTHER PUBLICATIONS

Spinellis D., et. al., Trusted Third Party Services for Deploying Secure Telemedical Applications over the WWW, Computers & Security, International Journal Devoted to the Study of the Technical and Financial Aspects of Computer Security, Elsevier Science Publishers, Amsterdam, NL, vol. 18, No. 7, 1999, pp. 627-639.

Press, J., Secure Transfer of Identity and Privilege Attributes in an Open Systems Environment, Computers & Security, International Journal Devoted to the Study of Technical and Financial Aspects of Computer Security, Elsevier Science Publishers, Amsterdam, NL, vol. 10, Vo. 2, Apr. 1, 1991, p. 117-127, ISSN: 167-4048.

Lopez, J., et. al., An User Authentication Infrastructure for Extranet Applications, Proceedings $33^{rd}$ Annual 1999, International Carnahan Conference on Security Technology, Madrid, Spain Oct. 5-7, 1999, IEEE International Carnahan Conference on Security Technology, New York, NY, IEEE, US, vol. Conf. 33, Oct. 5, 1999, pp. 354-362.

Anonymous, Internet, BYU's Web Filter Keeps Smut Away From Students, Apr. 1997, Cancerweekly Plus, pp. 12-13.

Gornstien. Leslie, Bill May Link Cyber Filters, School Funds // LEGISLATION: The law would require that devices be installed on student computers, Feb. 1998, Orange County Register, pp. 1-2.

Anonymous, Merriam-Webster's Collegiate Dictionary, 2001, Merriam-Webster, Incorporated, Tenth Edition, p. 1372.

Chu et al. Pic Signaled Labels (DSig) 1.0 Specification, http://www.w3.org/TR/REC-DSig-label/ (May 1998).

Dean, D. et al, Java Security: From Hotjava to Netscape and Beyond, Proceedings of the 1996 IEEE Symposium on Security and Privacy, Oakland, CA, May 8, 1996.

Hamilton, M. A., Java and the Shift to Net-Centric Computing, Computer, vol. 29, No. 8, Aug. 1996, pp. 31-39.

U.S. Appl. No. 09/311,607, filed May 13, 1999, Coulthad et al.

U.S. Appl. No. 09/312,751, filed May 13, 1999, Coulthad et al.

U.S. Appl. No. 10/471,701, filed Sep. 12, 2003, Rosenberg et al.

U.S. Appl. No. 09/661,873, filed Sep. 14, 2000, McLeod et al.

* cited by examiner

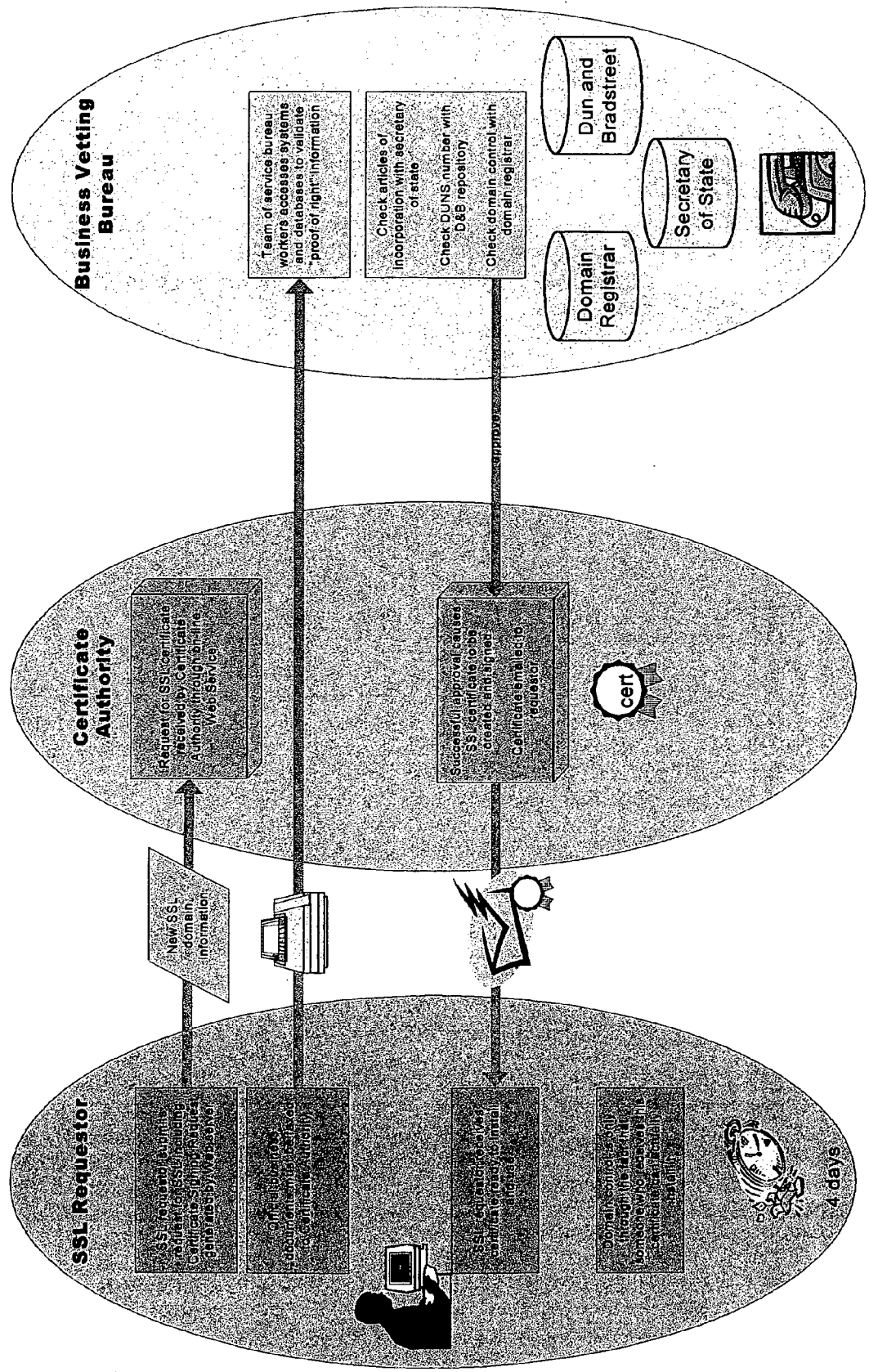
Figure 1 - Traditional Vetting
Prior Art

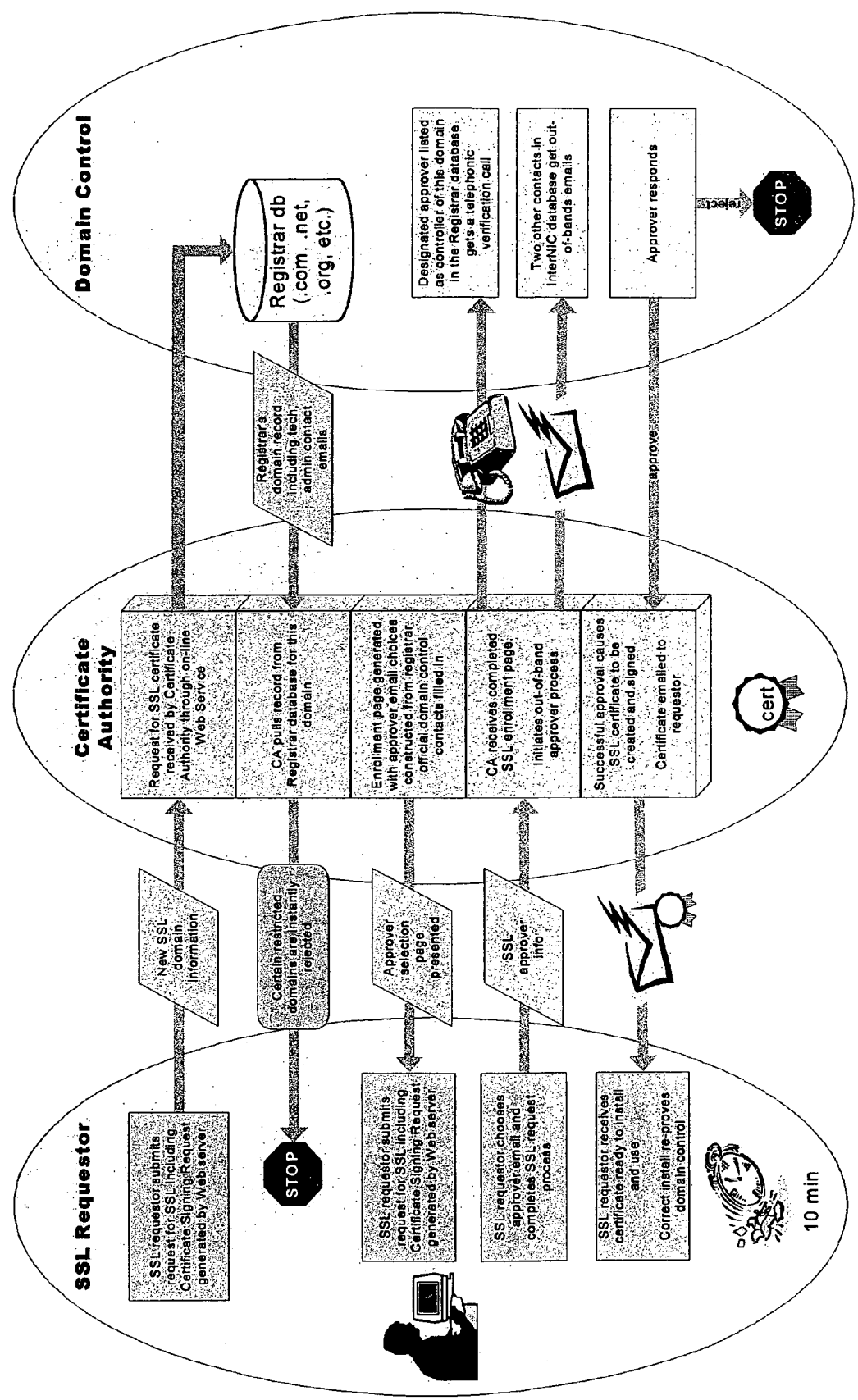
Figure 2 - GeoTrust Vetting

Figure 3a - Initial QuickSSL Premium enrollment page

Figure 3b – Initial enrollment page (cont)

Enter CSR

After generating your server's Certificate Signing Request as described in Generate CSR, paste the CSR in the form below. Please make sure that it contains the complete header and footer 'BEGIN' and 'END' lines exactly as in the example below.

SAMPLE ONLY

```
-----BEGIN NEW CERTIFICATE REQUEST-----
[sample encoded CSR content]
-----END NEW CERTIFICATE REQUEST-----
```

Certificate Signing Request *

```
-----BEGIN NEW CERTIFICATE REQUEST-----
MIIDGDCCAoACAQAwgYIxGjAYBgNVBAMTEXRlc3QuZZVvdHJlc3QuY29tLRRIwEATD
VQQLEwlHZW9DZW5OZXIxETAPBgNVBAoTCEdlblRydXN0MRguFgYDVQQHEw9XZBxs
ZXNsZXRgSG1sbHHxFjAUBgNVBAgTDU1hc3NhY2h1c2V0dHMxCzAJBgNVBAYTAlVT
MICfHAOCCSqCSIb2DQEBAQUAA4GNADCBiQKBgQCSHOUryOUXCgCcAp+xOUUTmNX3
ujrwJCQuWdaIOnVg/AK7QPWn8UAow/qlprrbXfDFmyD9rOtLrY9d59FhH1SJ6cSY/
rH0ek10Dxm3vv7pqgabUi3uJriCupQXgcS91STyya6jJQln3NsuisTNCson4cAki
de2qy9u/I9fSGqi15QIDAQABoIIBUzAaBgorBgEEAYI3DQIDHQwWCjUuHC4yHTkl
LjIwNQYKKwYBBAGCNwIBDjBnMCOwDgYDVR0PAQH/BAQDAgTwMBMGA1UdJQQHMAoG
CCsGAQUFBwMBMIH9BgorBgEEAYI3DQICHYHuMIHrAgEBHLoATQBpAGMAcgBvAHMA
bwBmAHQAIABSAFMAQQAgAFMAQwBoAGRAbgBuAGUAbAAgAEMAcgBSAHAAdABvAGcA
cgBhAHAAaABpAGMAIABQAHIAbwB2AGkAZAB1AHIDgYkAIHcLSD2mwrTSX438x7Un
wbf2+icI9AF07A2nxMclI8JTcXBDRKAUkRA3LocSfvOjQIytT3erOeHVNC13ZhTq
VYdC6deshzK2YAUWOGJ=1foOnV7jVaNzY3iKUnLLUYUyzxzpxlm3YY/rLIgjvj86-
+Rb22/2d7NSsysRIxYO/gHUAAAAAAAAAADANDgkqhkiG9w0BAQUFAAOBgQAGLCaB
tmvVlgBsdo5S3atRtIpC7T23iZfqmpALyUpiyA2u0/jjIIO0j7jIeQBk2UdQtBlW
7ECA8/d9SO1C7RbyQDuk9w0xJxuJrI+Sxi3Ae6kGpFxR93/D8Lc3xb9bSuk0V4Cn
GE6GxKixHYkenBTphKMIsxtnthaWkLZZxR8AiQ==
-----END NEW CERTIFICATE REQUEST-----
```

Server Type

Please select the type of web server below so the certificate can be correctly formatted.

Web Server Type *

[Microsoft IIS 5.0 ▼]

* Indicates required field.

[Continue]

Privacy Policy   Terms and Conditions

Figure 4 – CSR Review and confirmation page
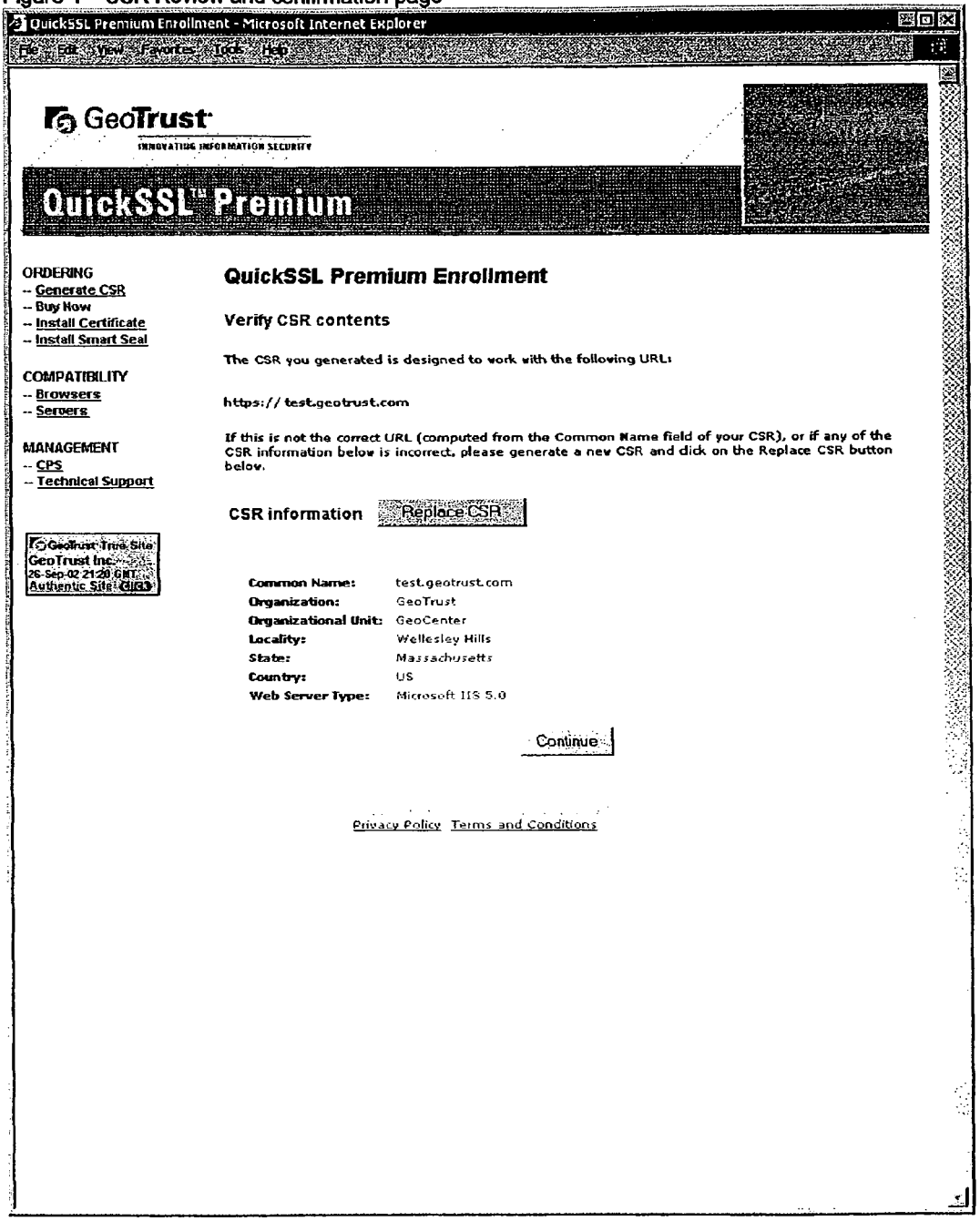

Figure 5a – Order Contact information page

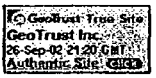
Figure 5b – Order Contact information page (cont)

Figure 6 – Approval selection page
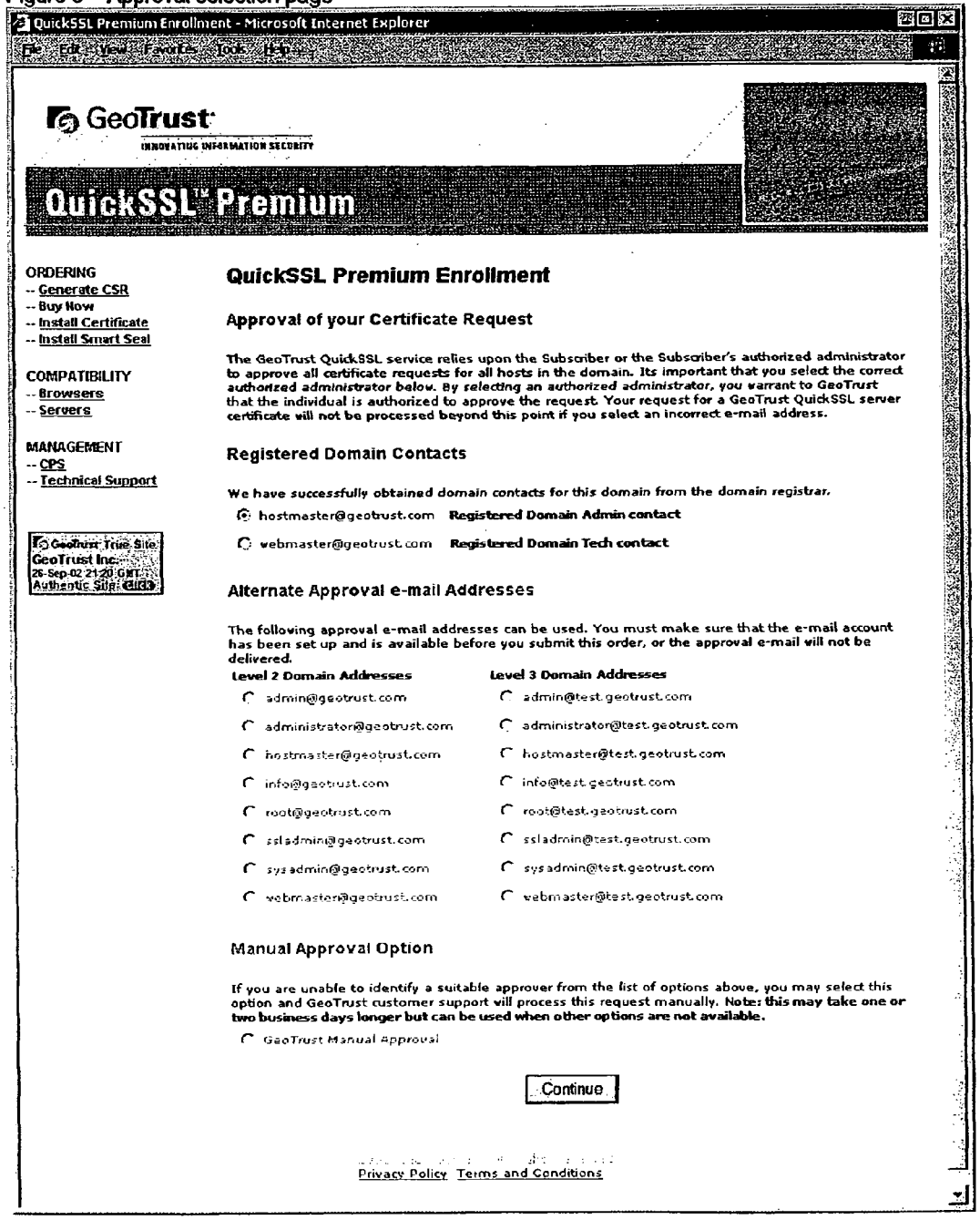

Figure 7 – Payment page

Figure 8a – Order Summary and Subscriber confirmation page

GeoTrust
INNOVATING INFORMATION SECURITY

QuickSSL™ Premium

ORDERING
-- Generate CSR
-- Buy Now
-- Install Certificate
-- Install Smart Seal

COMPATIBILITY
-- Browsers
-- Servers

MANAGEMENT
-- CPS
-- Technical Support

GeoTrust True Site
GeoTrust Inc.
26-Sep-02 21:26 GMT
Authentic Site GT03

QuickSSL Premium Enrollment

Order Summary

Please review the information on this page and agree to the subscriber agreement. When you have completed this review, please submit your order for processing.

Order Information [Edit]

Validity Period: 12 months
Web Server: Microsoft IIS 5.0

CSR Information [Edit]

Common Name: test.geotrust.com
Organization: GeoTrust
Org. Unit: GeoCenter
Locality: Wellesley Hills
State: Massachusetts
Country: US Note: The value for Common Name must exactly match the server you plan to secure.

Site Contacts [Edit]

| Role | Name | Phone | E-Mail |
|---|---|---|---|
| Applicant | Doug Beattie | 781-263-4108 | dougb@geotrust.com |
| Technical | Doug Beattie | 781-263-4108 | dougb@geotrust.com |
| Billing | Doug Beattie | 781-263-4108 | dougb@geotrust.com |

Approver Information [Edit]

Upon submission of this order, an e-mail will be sent to the following e-mail address. This e-mail account must be active and ready to receive e-mail.

Approver e-mail: hostmaster@geotrust.com

Billing Information [Edit]

Figure 8b – Order Summary and Subscriber confirmation page (cont)

Approver Information Edit

Upon submission of this order, an e-mail will be sent to the following e-mail address. This e-mail account must be active and ready to receive e-mail.

Approver e-mail: hostmaster@geotrust.com

Billing Information Edit

Credit Card Brand: VISA
Credit Card Number: 5105 xxxxxxxx 5100
Expiration Date: 12/04
Cardholder Name: GeoTrust Upon completion of this order and delivery of the certificate to you, your credit card will be charged $2.00 USD. This price was calculated based on your selections of order options. If this price is not correct, please do not proceed.

Certificate Replacement Policy

GeoTrust will replace, revoke, and refund certificates that have been issued within seven (7) days only of the certificate issue date. If you need a new certificate after seven days, you will be responsible for purchasing a new server certificate.

QuickSSL Subscriber Agreement

Please carefully read the following agreement, and mark the checkbox below.

```
QUICKSSL(tm) SUBSCRIBER AGREEMENT

Please read the following agreement carefully. By
submitting an application to obtain a QuickSSL(tm)
Certificate and accepting and using such certificate,
you indicate the acceptance of the following terms and
conditions and you agree to be bound by them.

This GeoTrust QuickSSL(tm) Web Server Certificate
Subscriber Agreement (this "Agreement") is made by and
between GeoTrust Inc. ("GeoTrust") and you, a
certificate applicant and governs your application
for, issuance and use of a GeoTrust QuickSSL Web
```

☑ I agree to this Subscriber Agreement *

Click the Submit Order button (below) to send your QuickSSL enrollment information to GeoTrust.

The process may take a few seconds to complete. You need to click "Submit Order" only once. You will receive your order ID on the next screen with instructions regarding next steps.

[ Submit Order ]

Privacy Policy. Terms and Conditions

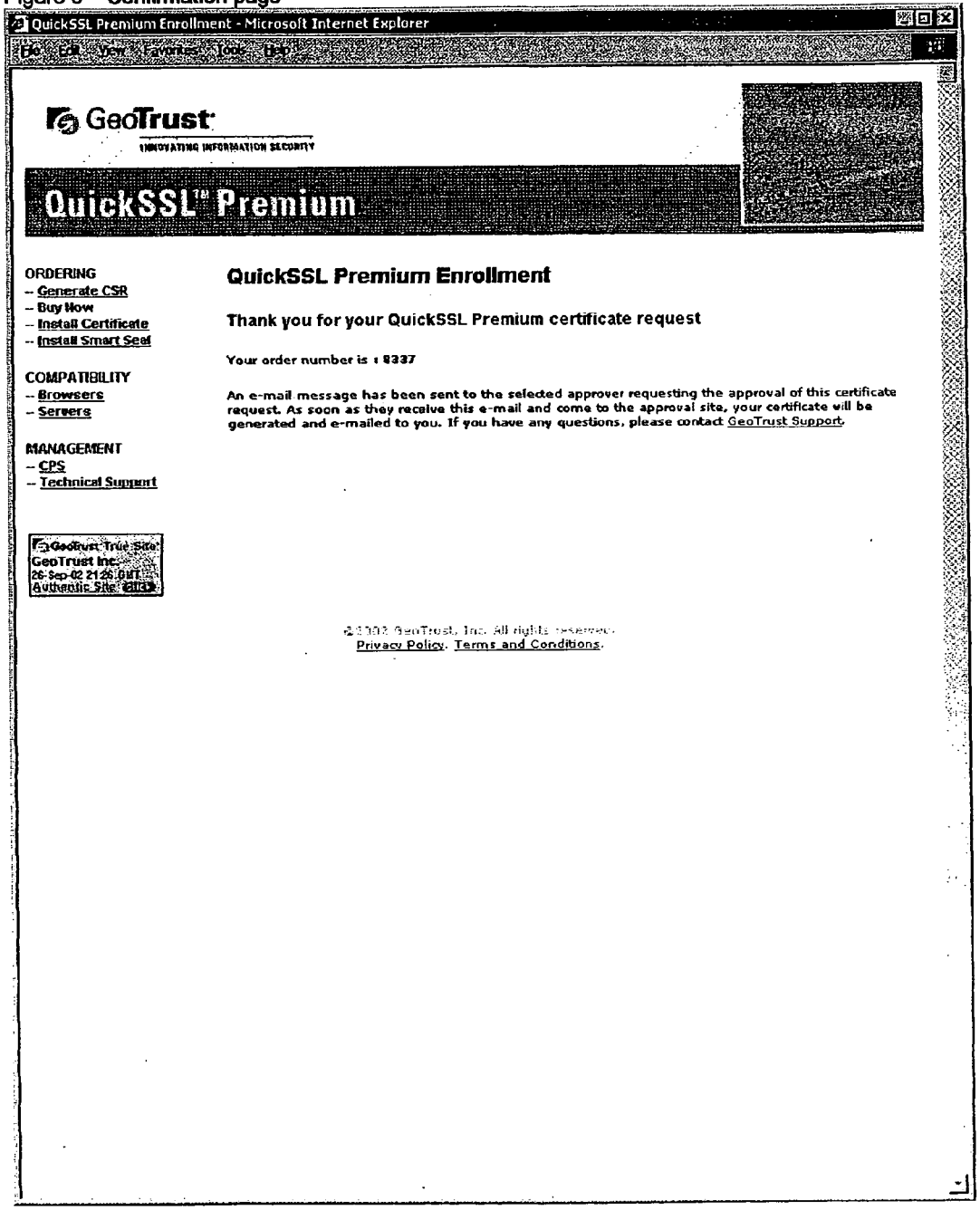
Figure 9 – Confirmation page

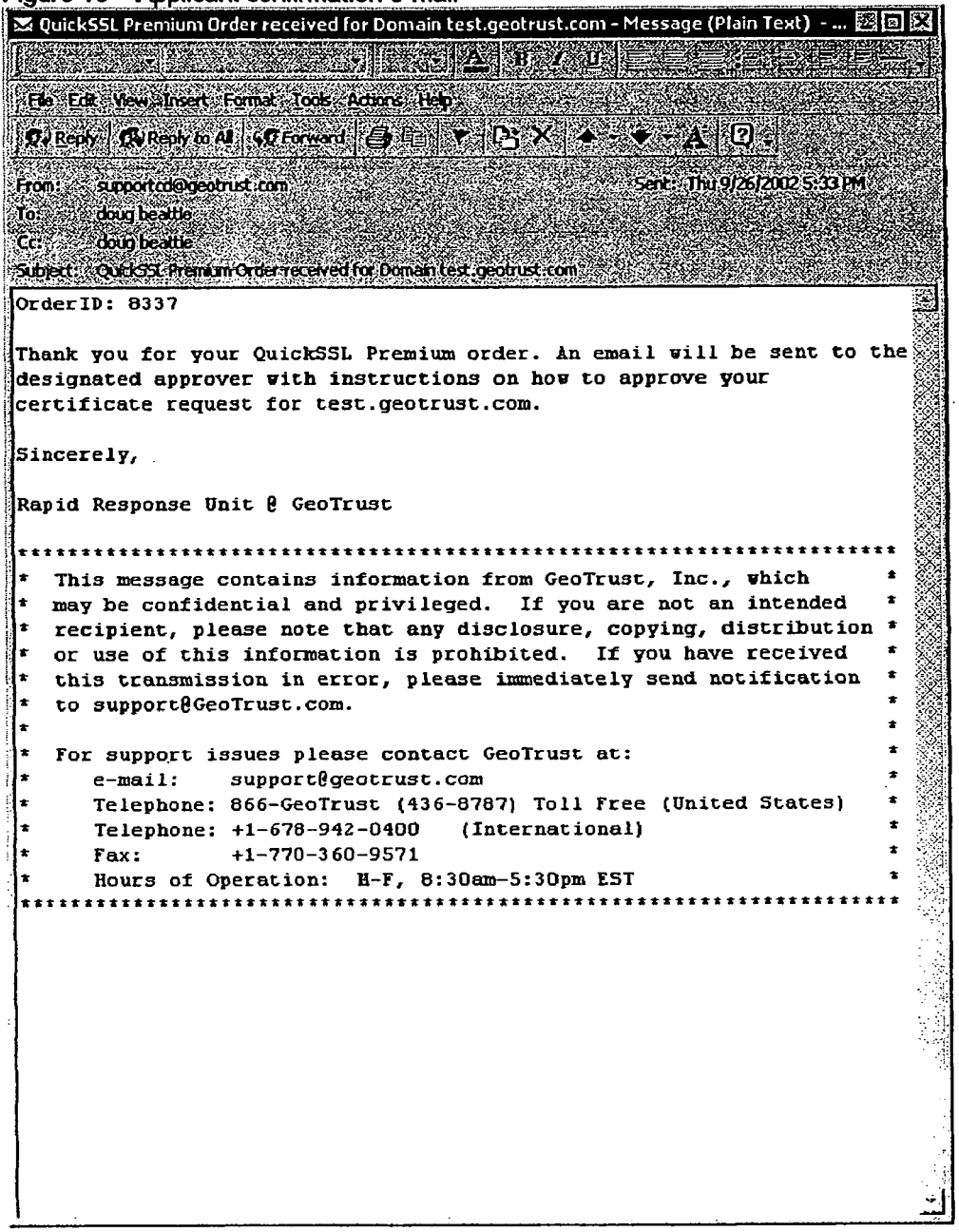
Figure 10 – Applicant confirmation e-mail

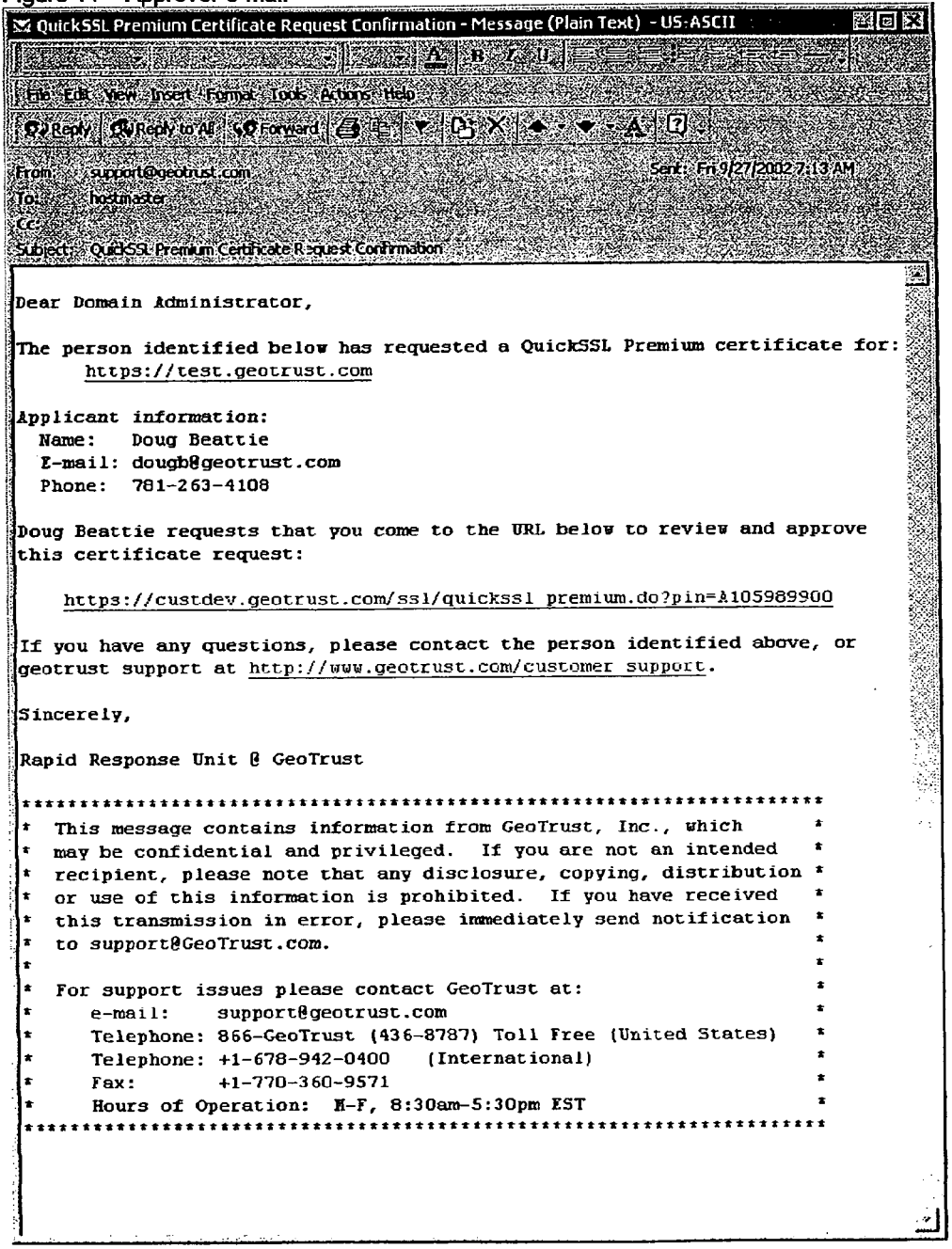
Figure 11 – Approver e-mail

Figure 12 – Approver review and confirmation page

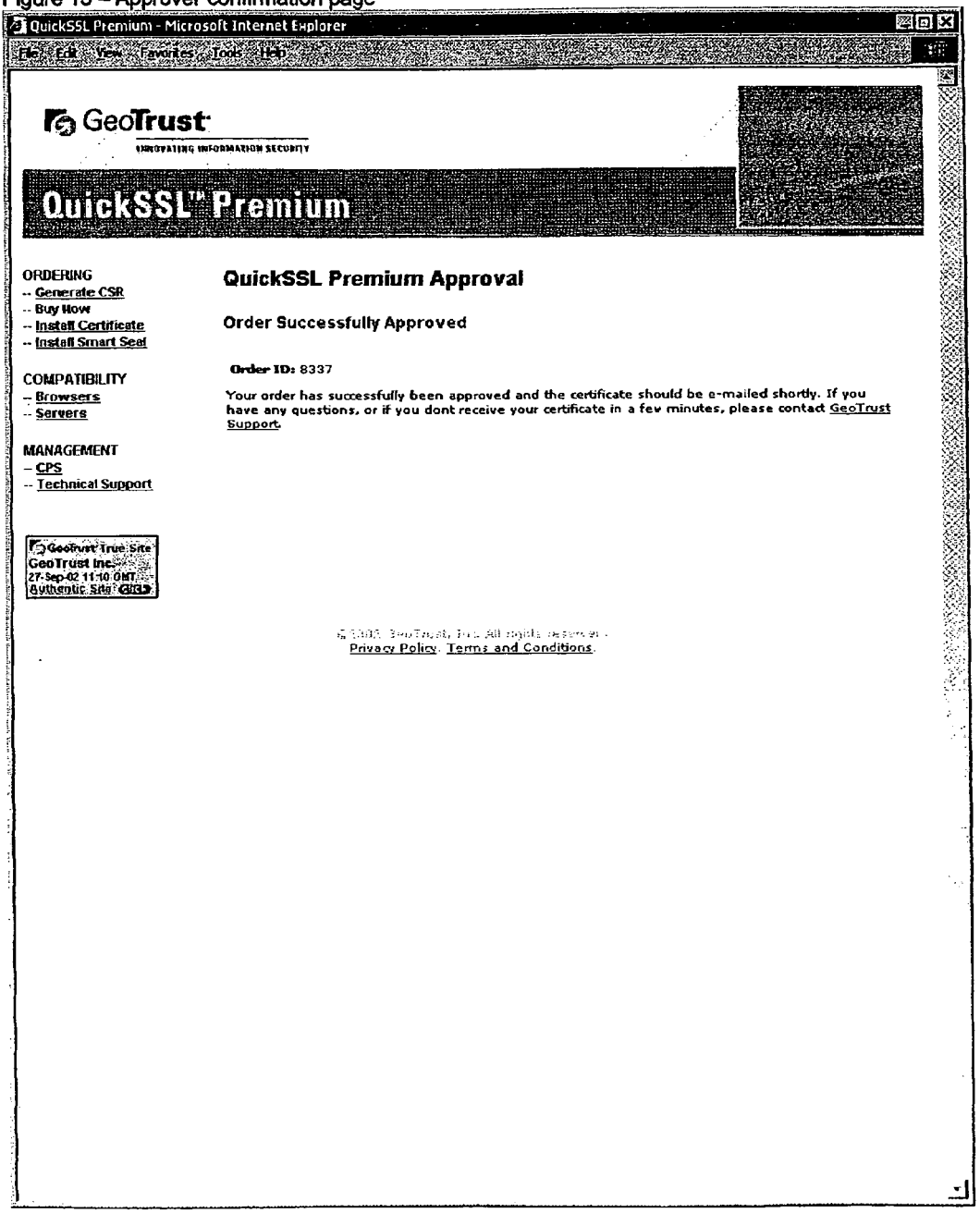
Figure 13 – Approver confirmation page

Figure 14a – Fulfillment e-mail
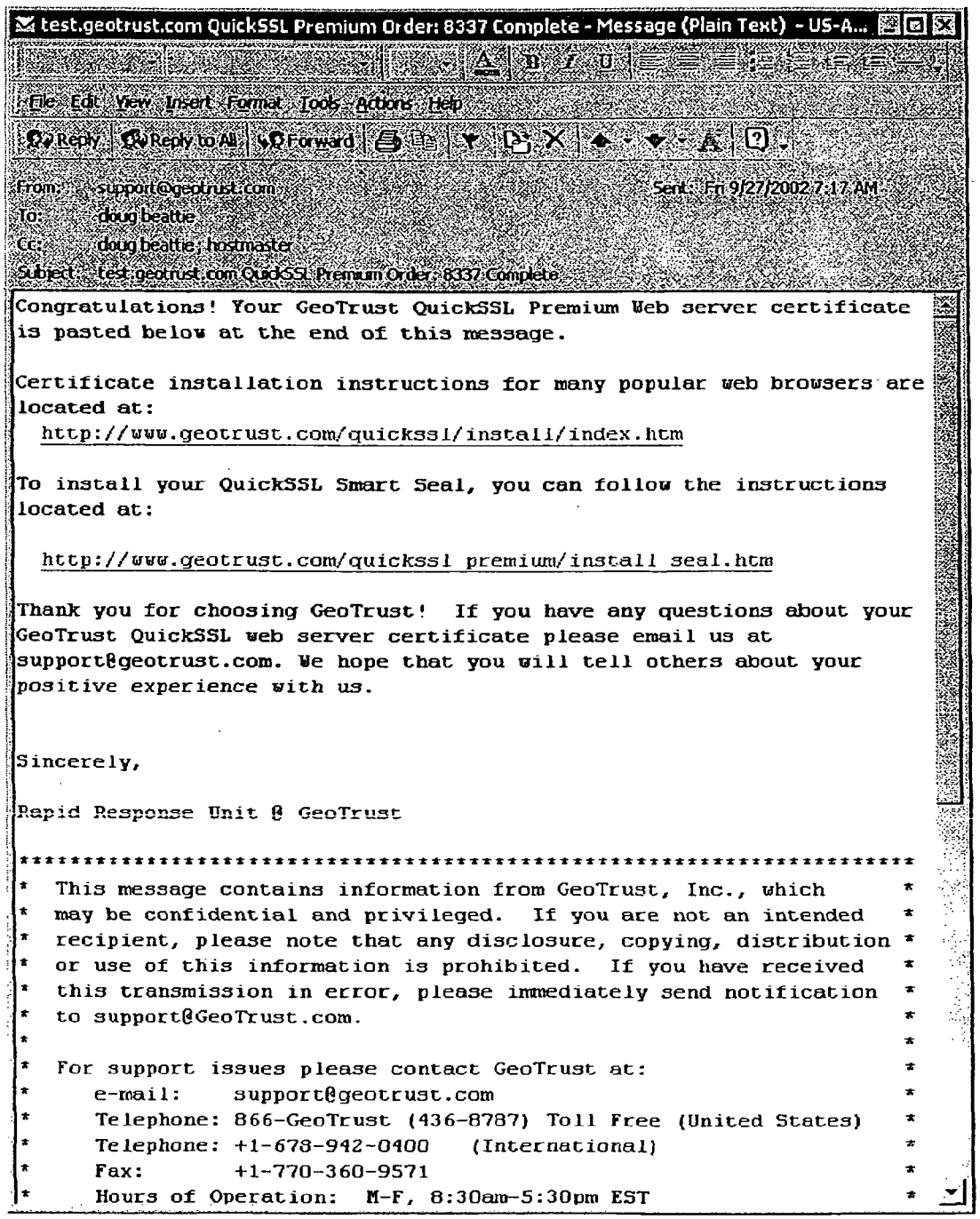

Figure 14b – Fulfillment e-mail (cont)
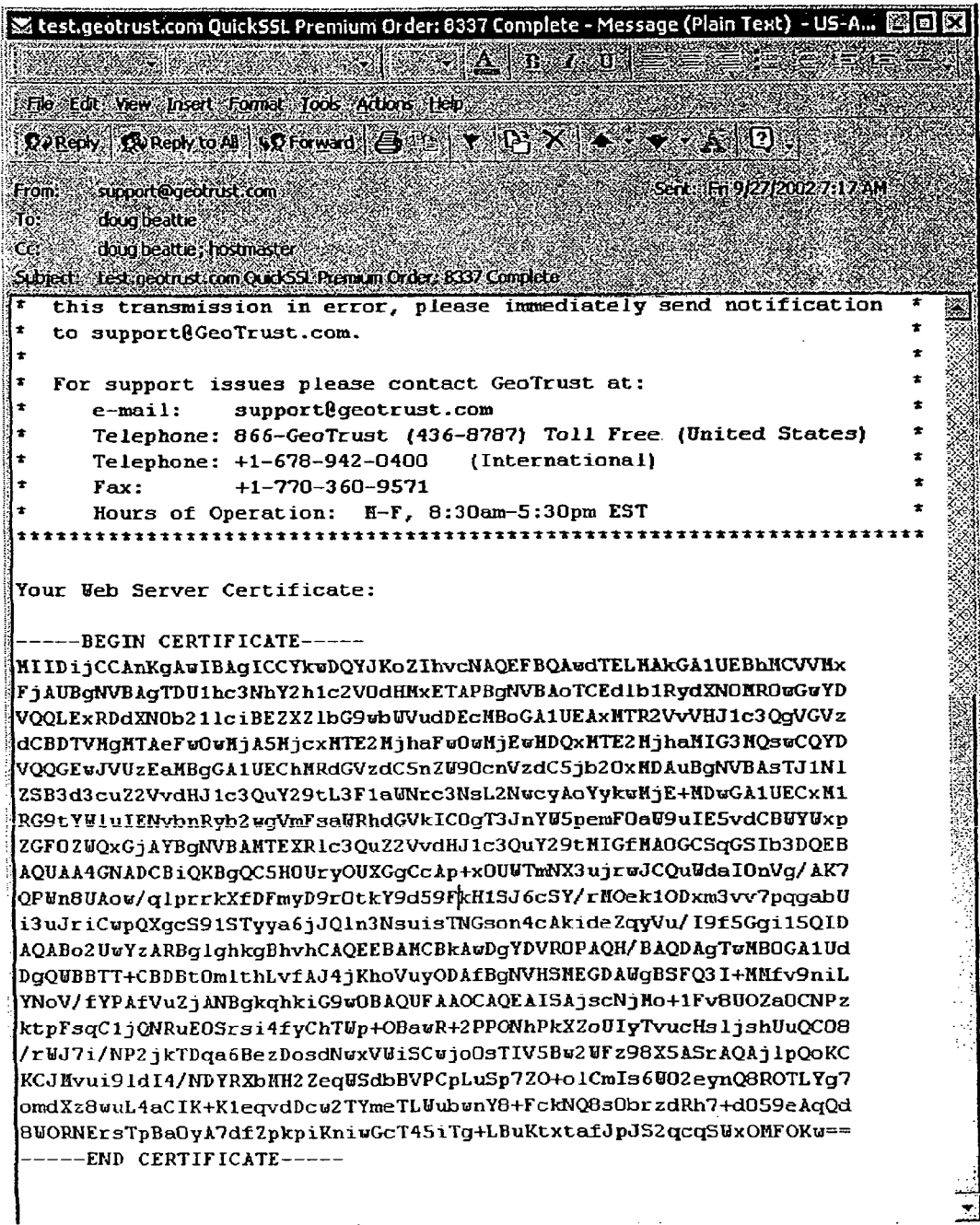

Hosting Company: None

Approval of your Certificate Request

The FreeSSL service relies upon the Subscriber or the Subscriber's authorized administrator to approve all certificate requests for all hosts in the domain. GeoTrust obtains the registered Administrator and Technical Contact e-mail addresses for some Subscribers, and we recommend that you use these email addresses when completing the enrollment as the address of your authorized administrator if appropriate. We have also included other standard e-mail addresses within the Subscriber's domain that are commonly used b authorized administrators. Before selecting one of the e-mail addresses listed below, you should verify that it is a valid e-mail address since you will not be notified of any e-ma delivery failures.

It's important that you select the correct authorized administrator of the Subscriber from the list below. By selecting an authorized administrator, you warrant to GeoTrust that the individual is authorized to approve the Subscriber's request. Your request for a FreeSSL server certificate will not be processed beyond this point if you select an incorrect e-mail address.

| Authorized Domain Administrators | Level 4 domain address | Level 3 domain address | Level 2 domain address |
|---|---|---|---|
| ○ billing@PHPWEBHOSTING.COM | ○ sysadmin@cp.dogwood.phpwebhosting.com | ○ sysadmin@dogwood.phpwebhosting.com | ○ sysadmin@phpwebhosting.com |
| ○ support@PHPWEBHOSTING.COM | ○ administrator@cp.dogwood.phpwebhosting.com | ○ administrator@dogwood.phpwebhosting.com | ○ administrator@phpwebhosting.com |
| | ○ admin@cp.dogwood.phpwebhosting.com | ○ admin@dogwood.phpwebhosting.com | ○ admin@phpwebhosting.com |
| | ○ hostmaster@cp.dogwood.phpwebhosting.com | ○ hostmaster@dogwood.phpwebhosting.com | ○ hostmaster@phpwebhosting.co |
| | ○ webmaster@cp.dogwood.phpwebhosting.com | ○ webmaster@dogwood.phpwebhosting.com | ○ webmaster@phpwebhosting.co |
| | ○ info@cp.dogwood.phpwebhosting.com | ○ info@dogwood.phpwebhosting.com | ○ info@phpwebhosting.com |
| | ○ root@cp.dogwood.phpwebhosting.com | ○ root@dogwood.phpwebhosting.com | ○ root@phpwebhosting.com |

The authorized administrator you selected above will likely need to contact you to verify this request, so be sure your email address is correctly entered in the Enrollment Form.

Subscriber Agreement

Before you submit to confirm your FreeSSL certificate request, it is necessary for you to agree to the following Subscriber Agreement on behalf of the Subscriber:

SUBSCRIBER AGREEMENT

Please read the following agreement carefully:

I hereby represent that I am fully authorized to apply for a GeoTrust

Figure 19c

METHODS AND SYSTEMS FOR AUTOMATED AUTHENTICATION, PROCESSING AND ISSUANCE OF DIGITAL CERTIFICATES

CROSS REFERENCE TO RELATED APPLICATIONS

This application claims priority from U.S. Provisional Application Ser. No. 60/328,766, filed Oct. 12, 2001, the disclosure of which is incorporated herein by reference. A portion of the disclosure of this patent document contains material which is subject to copyright protection. The copyright owner has no objection to the facsimile reproduction by anyone of the patent disclosure, as it appears in the Patent and Trademark Office public patent files or records, but otherwise reserves all copyright rights whatsoever.

BACKGROUND OF THE INVENTION

The present invention relates to methods and systems for identification, processing and issuance of server based digital certificates.

In order to secure information transmitted over the Internet, methods have been developed to secure the connection between web browsers and web servers. Secure sockets layer (SSL), recently re-named TLS but substantially the same protocol, is a protocol designed to enable communications on an insecure network such as the Internet. SSL provides encryption and integrity of communications along with server authentication using digital certificates. However, an SSL connection does not ensure the identity of the recipient of the information nor does it secure the information once it is decrypted at the web server. Therefore, it is important to be certain that the web server is legitimate.

It has become common practice to use web server digital certificates to authenticate the identity of a web server to visiting browsers. A user's browser will access the web server's digital certificate when directed to enter a secure session. The certificate, which contains the web server's public key is then used by the browser to authenticate the identity of the website, that is, the web server and to provide the web browser with the web server's public key so that the web browser can encrypt a session key for use in encryption of transmitted data. Since only the web server has the private key to decrypt the user's information, such information remains secure. The web server certificate is issued by a certification authority. Applicants' assignee, GeoTrust, Inc. is a certification authority. Most web browsers are published with a number of root digital certificates (containing public keys) for CA's already installed and hence the web browser will recognize the CA's signature and trust the certificate.

Generally, in order to obtain a certificate, the website owner, the Requestor, will submit a certificate signing request (CSR), or its equivalent, containing the web server's public key, along with other information, to a certification authority (CA) and the CA, when satisfied as to the identity of the Requestor, will issue a certificate containing the web server's public key and sign the certificate using the CA's private key. A traditional method for vetting the web server Requestor is shown in FIG. 1. The present invention is directed to methods and systems for automating the identification of the web server Requestor in issuing web server certificates.

SUMMARY OF THE INVENTION

A computer system and process for automated authentication, processing and issuance of digital certificates, wherein web server domain-control vetting is employed in the identification and authorization of the Requestor. Domain-control vetting, in accordance with the present invention, includes the mandatory selection of Approver contact addresses by the Requestor wherein the Approver contact addresses, for example, email addresses, have been generated based on domain information. A Requestor requests a web server certificate from a certificate authority, the certificate authority receives the request. The certificate authority generates Approver email addresses, and the Requestor is required to select an Approver email address or addresses. On the other hand, the Requestor can submit one or more email addresses and if one or more of these email addresses are also certificate authority generated Approver email addresses, then the certificate authority can accept the Requestor submitted email addresses that match. The certificate authority contacts the Approver using the selected email address or addresses and requests that the Approver approve issuance of the certificate. If approved, the certificate authority accepts the request, and creates and signs the certificate and the signed certificate is sent to the Requestor.

BRIEF DESCRIPTION OF THE DRAWINGS

FIG. 1 shows one example of the traditional vetting process.

FIG. 2 shows one preferred embodiment of the vetting process of the present invention, namely, the QuickSSL vetting process.

Figure 3A:
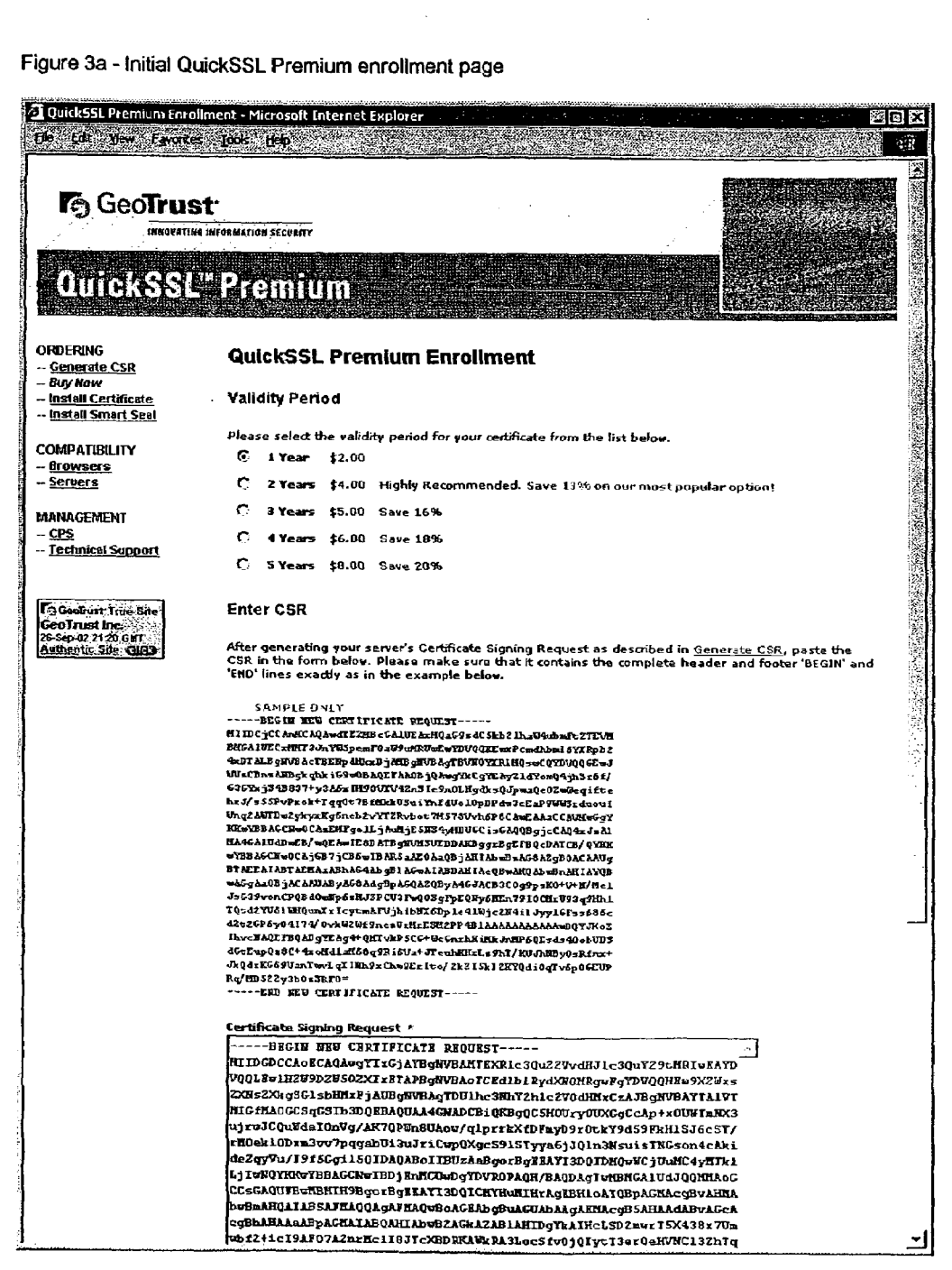

FIGS. 3a and 3b shows an Initial QuickSSL Premium enrollment page in accordance with one embodiment of the present invention.

FIG. 4 shows a CSR Review and confirmation page in accordance with the present invention.

FIGS. 5a and 5b show a Order Contact information page in accordance with one embodiment of the present invention.

FIG. 6 shows an Approval selection page in accordance with one embodiment of the present invention.

Figure 7:
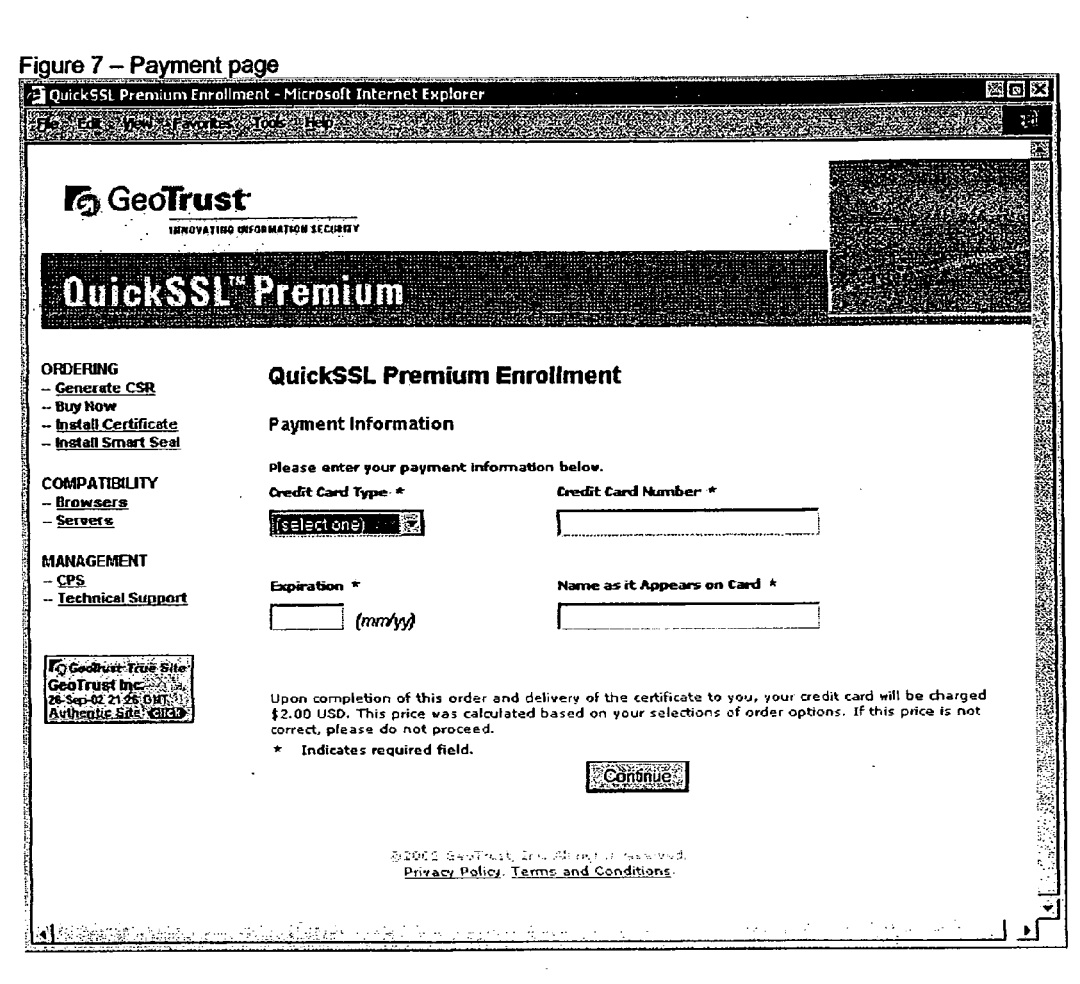

FIG. 7 shows a Payment page in accordance with one embodiment of the present invention.

FIGS. 8a and 8b show an Order Summary and Requestor (Subscriber) confirmation page in accordance with one embodiment of the present invention.

FIG. 9 shows a Confirmation page in accordance with one embodiment of the present invention.

FIG. 10 shows a Requestor (Applicant) confirmation email in accordance with one embodiment of the present invention.

FIG. 11 shows an Approver email in accordance with one embodiment of the present invention.

FIG. 12 shows an Approver review and confirmation page in accordance with one embodiment of the present invention.

FIG. 13 shows an Approver confirmation page in accordance with one embodiment of the present invention.

FIGS. 14a and 14b show a Fulfillment email in accordance with one embodiment of the present invention.

FIGS. 16a, 16b and 16c show a enrollment form in accordance with a second embodiment of the present invention.

FIGS. 18a and 18b show one manifestation of how the enrollment form and other pages in accordance with the second embodiment of the present invention are interactive and self-correcting, requiring the Requestor (Subscriber) to correct errors and add omitted but necessary information before proceeding.

FIGS. 19a, 19b, 19c and 19d show the enrollment information conformation and Subscriber Agreement process in accordance with a second embodiment of the present invention.

DESCRIPTION OF THE INVENTION

Figure 15A:
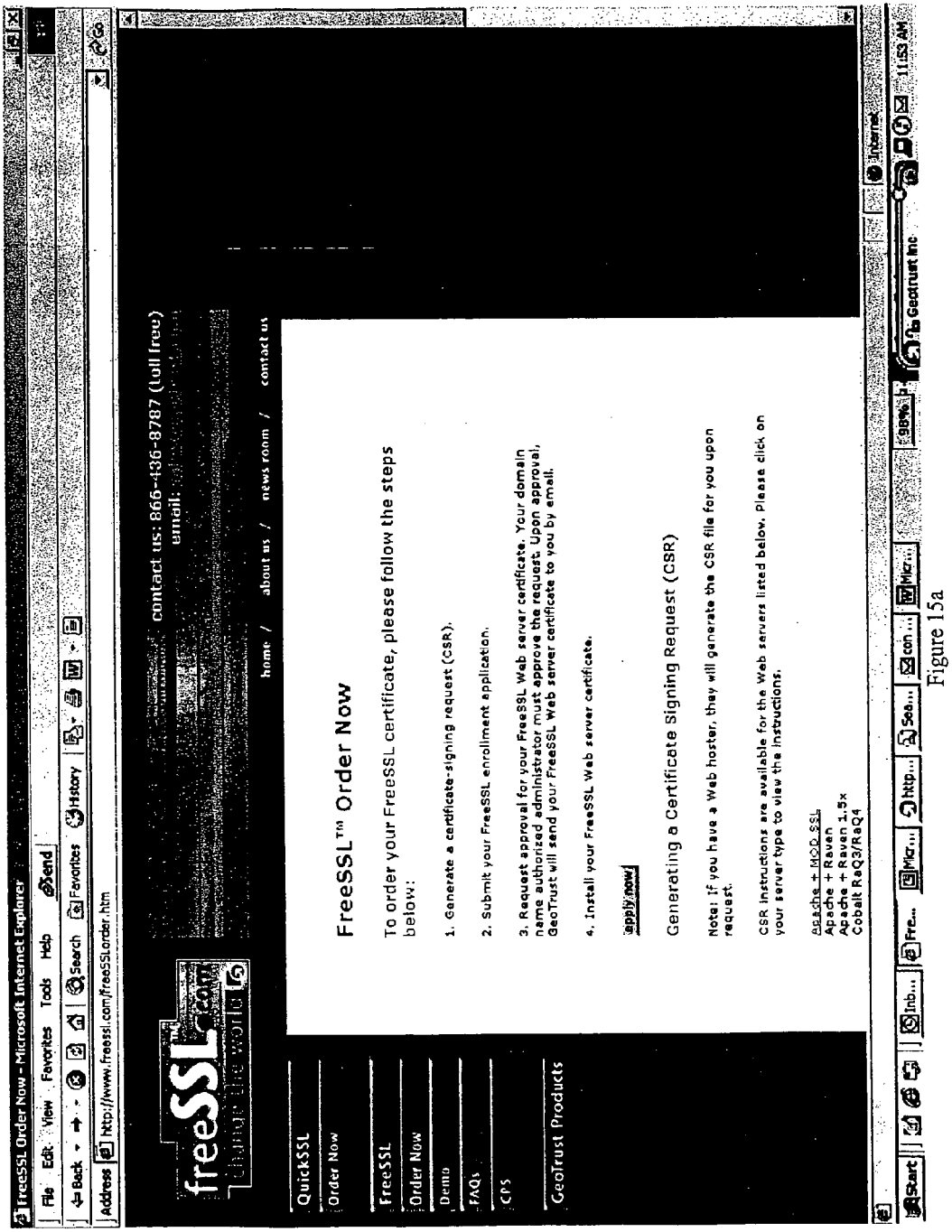
FIGS. 15a and 15b show the initial certificate order pages in accordance with a second embodiment of the present invention.

The aspects, features and advantages of the present invention will become better understood with regard to the following description with reference to the accompanying drawings. What follows are preferred embodiments of the present invention. It should be apparent to those skilled in the art that the foregoing is illustrative only and not limiting, having been presented by way of example only. All the features disclosed in this description may be replaced by alternative features serving the same purpose, and equivalents or similar purpose, unless expressly stated otherwise. Therefore, numerous other embodiments of the modifications thereof are contemplated as falling within the scope of the present invention as defined herein and equivalents thereto. Use of absolute terms, such as "will not . . . will," "shall," "shall not," "must," and "must not," are not meant to limit the present invention as the embodiments disclosed herein are merely exemplary.

This is a description for how the invention would apply to automated identification, processing, and issuance of digital certificates. For example, SSL server certificates, in this case through an Issuer's Web portal. This is only one of many potential systems, process flows and applications for the invention.

A First Preferred Embodiment

In accordance with the present invention the automated methods and systems for Requestor identification may be referred to as domain-control vetting, an example of the process for domain-control vetting is shown in FIG. 2. Domain control vetting is the process for verifying that a Requestor has permission from an Approver to obtain and install the product. The Approver must demonstrate control of the domain. Thus, in the present invention the Approver is differentiated from the Requestor. The Approver is an individual who has domain-control and has the responsibility for approving the Requestor's request for a domain-control vetted product (such as QuickSSL). The Requestor is the end user requesting the SSL certificate. In domain-control vetted orders the Requestor selects the Approver email address from a list of authoritative email addresses.

In initiating the request, the Requestor fills out an order form including Certificate Signing Request (CSR), and order contact information. See FIGS. 3a, 3b, 4, 5a and 5b. The Certificate Signing Request (CSR) is a block of information typically generated by the Web Server software that is meant to be submitted to a Certificate Authority (CA) in return for a SSL certificate. The CSR provide the Certificate Authority with the information necessary to generate the SSL Digital Certificate. When the Web Server generates the CSR it is actually generating a Private and Public Key pair. The private key is kept secret and the public key is bundled into the CSR. The CSR is digitally signed by the private key which proves to the CA that the Web Server has possession of the private key (called "proof of possession").

Next the Requestor is presented with a list of potential Approver emails. See FIG. 6. This list may be generated by combining domain related information. Disclosed below are three types of addresses which may be utilized. Of course there are other ways of determining the Approver's email address in accordance with the present invention. In this step of the process, the choices offered in the form for email address for the Approver (Approver Email Address or Addresses) are limited to those chosen by the Issuer, and cannot be altered or amended by the Requestor. The Approver Email Address choices offered on this page (FIG. 6) are not created by Requestor or entered into the Enrollment Form by the Requestor, and so the Requestor cannot divert or "short circuit" the approval process by directing the email message requesting official approval of the certificate issuance request to the Requestor or to an unauthorized person. This provides a security element of the automated process and system of the present invention.

In the first type, the system obtains the technical and administrative contacts from the WhoIs system- a database mandated by ICANN to be maintained by the domain registrars. In the case the system cannot determine the exact role of the person it will, in certain instances, pull out any e-mail address, for example the e-mail addresses in the response message could be for administrative, technical, billing or other e-mail addresses.

In the second type, the following list of mail box names, namely: admin, administrator, hostmaster, info, root, ssladmin, sysadmin, webmaster, or other names, may be pre-appended to the 2, 3, 4, . . . N component domain of the certificate being requested. For example, if the requested certificate was for "us.secure.geotrust.com", then the system in accordance with this embodiment of the present invention would allow the following: admin@us.secure.geotrust.com; admin@secure.geotrust.com; and admin@geotrust.com for each and every of the "mail boxes" listed above.

In the third type, "standard", fixed address sent to the CA's customer support group (support@CA.com) where they will address this on a case by case basis. For example, by sending it to support@ca.com or support@geotrust.com.

The Requestor chooses an Approver email, reviews the order information, agrees to the subscriber agreement and completes the order, including payment, and can review the order. See FIGS. 6, 7, 8a and 8b.

Figure 12:
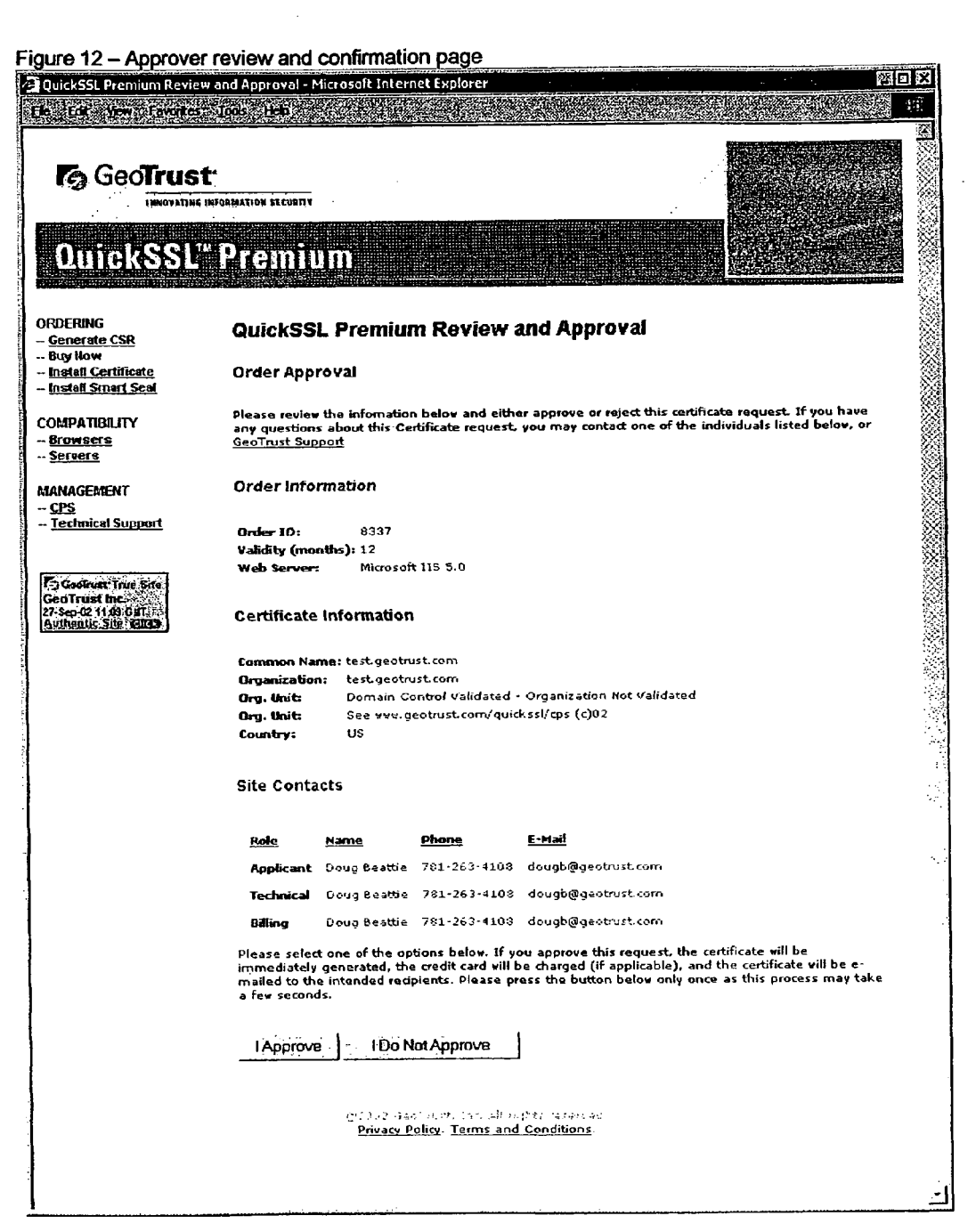

An e-mail is sent to the administrative and technical contacts acknowledging the receipt of the order, and the Approver e-mail is sent to the Approver. See FIGS. 9, 10 and 11. Approver receives email with embedded link to the approval site back at the CA and the Approver reviews the order information and either approves or rejects. See FIGS. 11, 12 and 13. Requestor receives digital certificate (and/or other fulfillment) via email. See FIGS. 14a and 14b.

A Second Preferred Embodiment

Figure 15B:
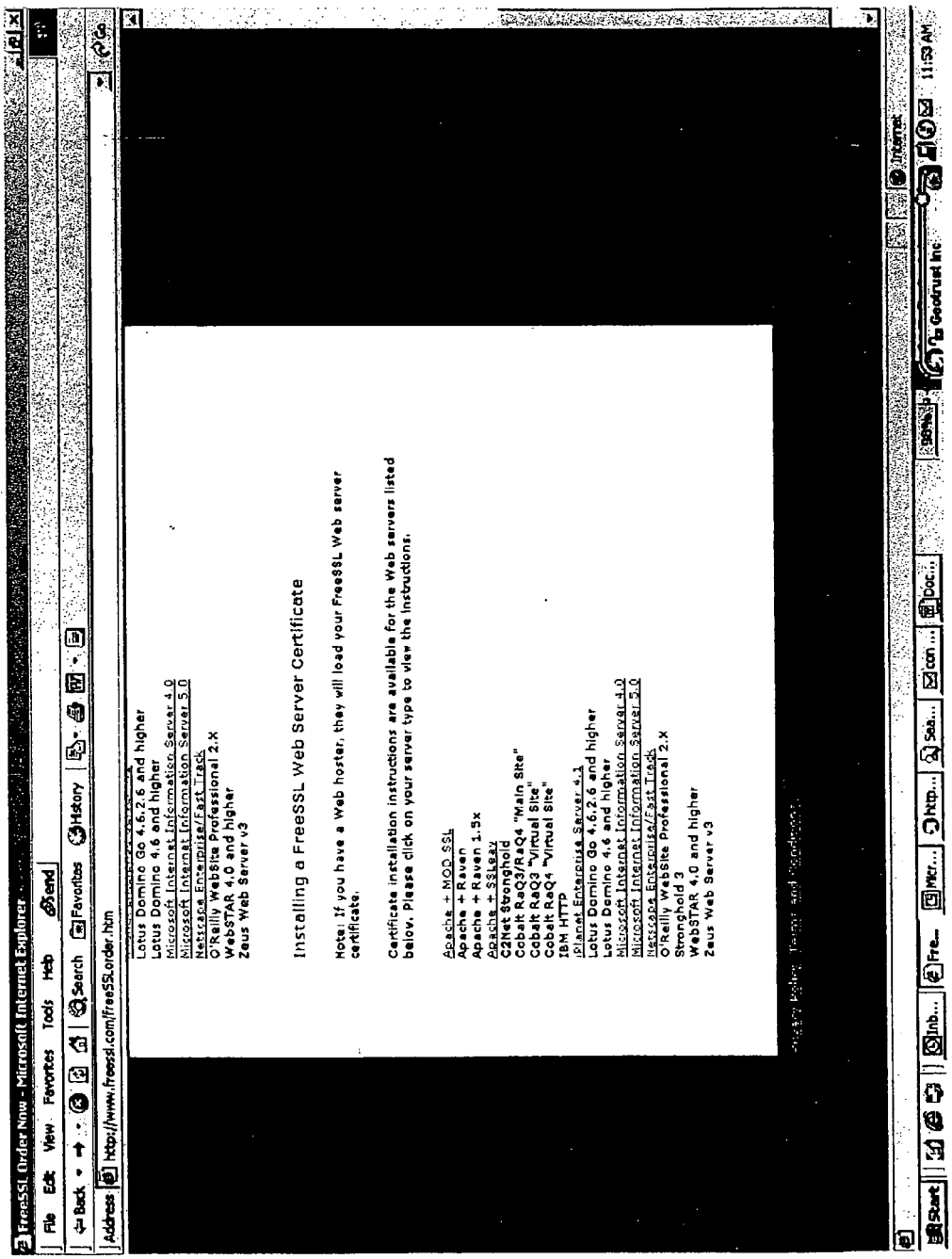

The Requestor in this embodiment is either the Web domain name registrant who will receive and use the SSL server certificate on the site, or a hosting company/Internet service provider or other agent acting upon the registrant's behalf, views initial certificate order pages and chooses to "order now." This brings Subscriber to a detailed instruction page, including technical assistance and hyperlinks to other resources and instructions. To proceed, Requestor clicks on "apply now" and is taken to the next page. See FIGS. 15a and 15b.

Figure 16A:
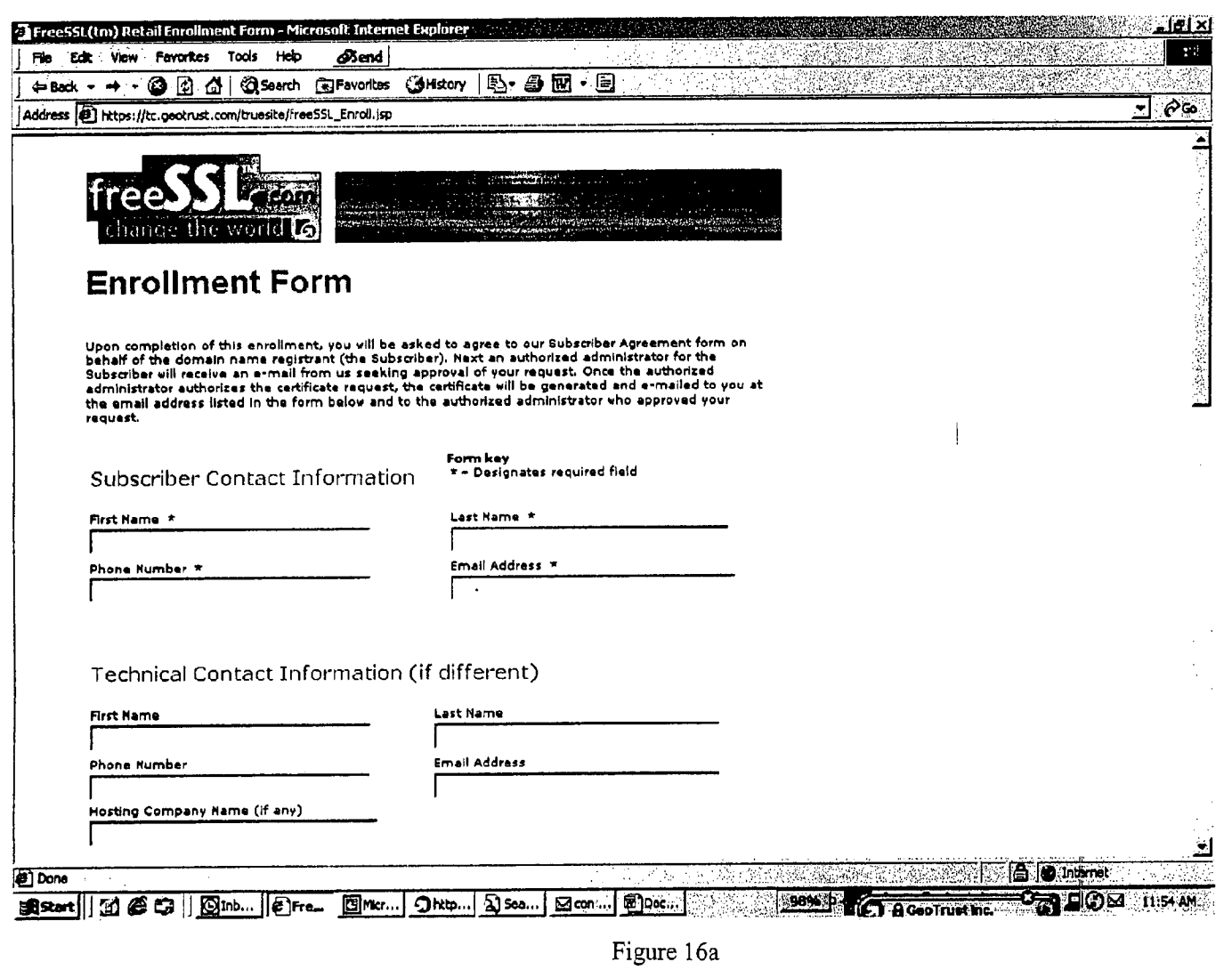
Figure 16B:
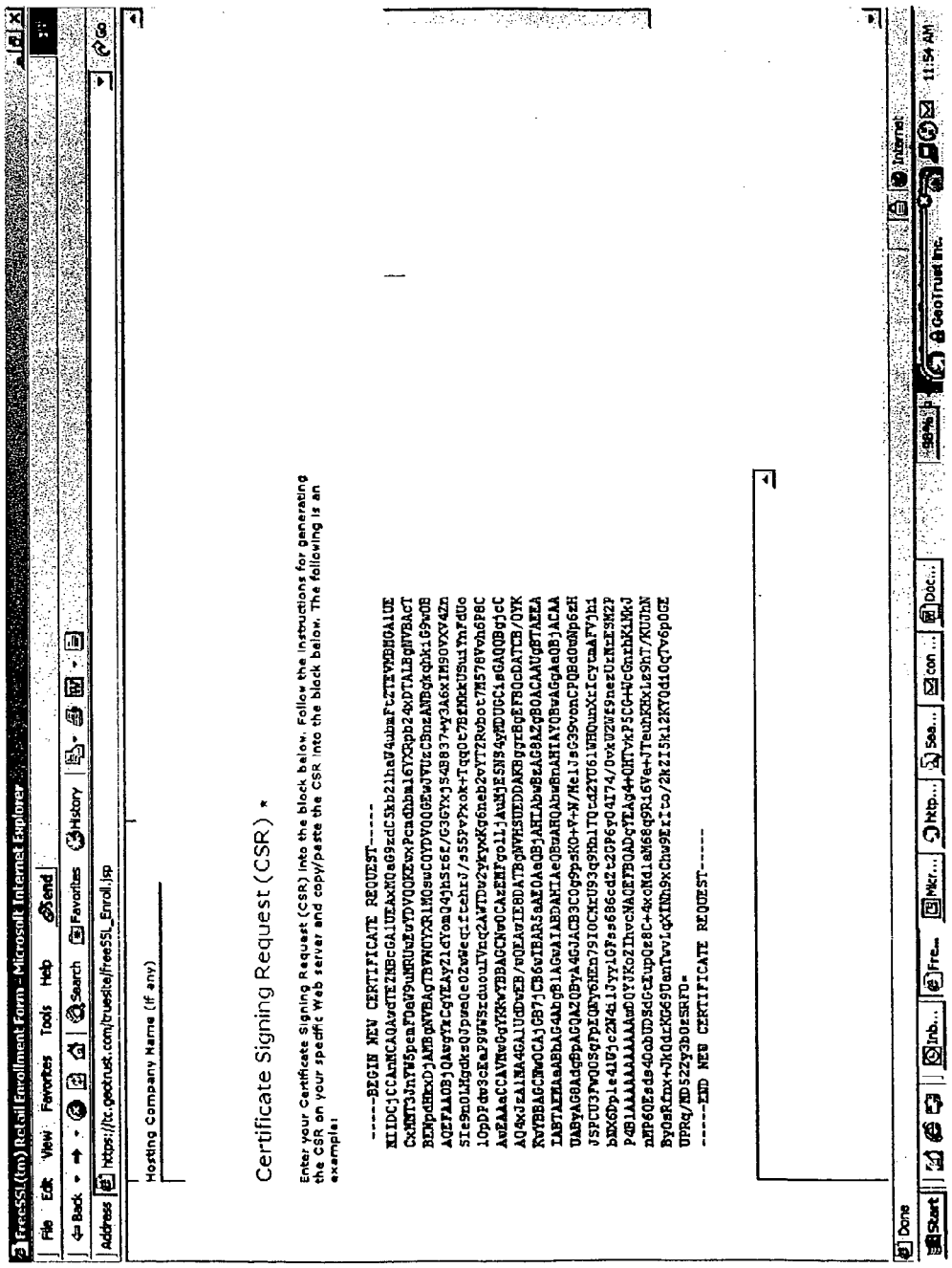
Figure 16C:
Figure 17:
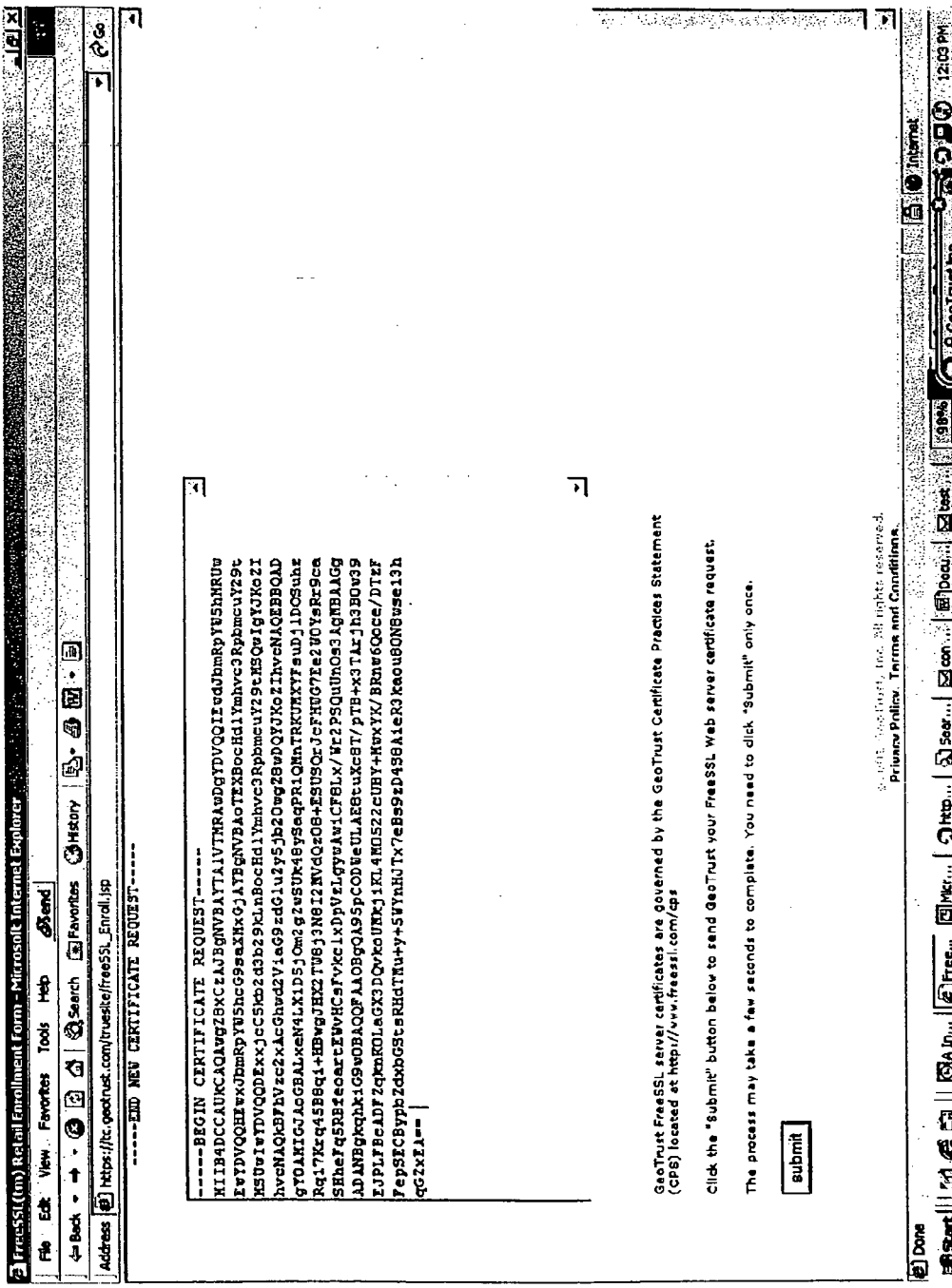
FIG. 17 shows the enrollment form in accordance with a second embodiment of the present invention wherein a CSR has been pasted into the required field.

The Requestor completes an Enrollment Form providing Requestor Contact and Technical Contact information (including email address) for future communications from Issuer. Requestor generates a Certificate Signing Request (CSR) through standard computer software, and pastes a copy of the CSR in the field indicated on the Enrollment Form to request the SSL server certificate. This page and other pages contain relevant terms and conditions for the transaction and process (e.g., references to the applicable Certificate Practice Statement. To proceed, Requestor clicks "submit." See FIGS. 16a, 16b and 16c. The Enrollment Form showing a CSR pasted into required field is shown on FIG. 17.

Figure 18A:
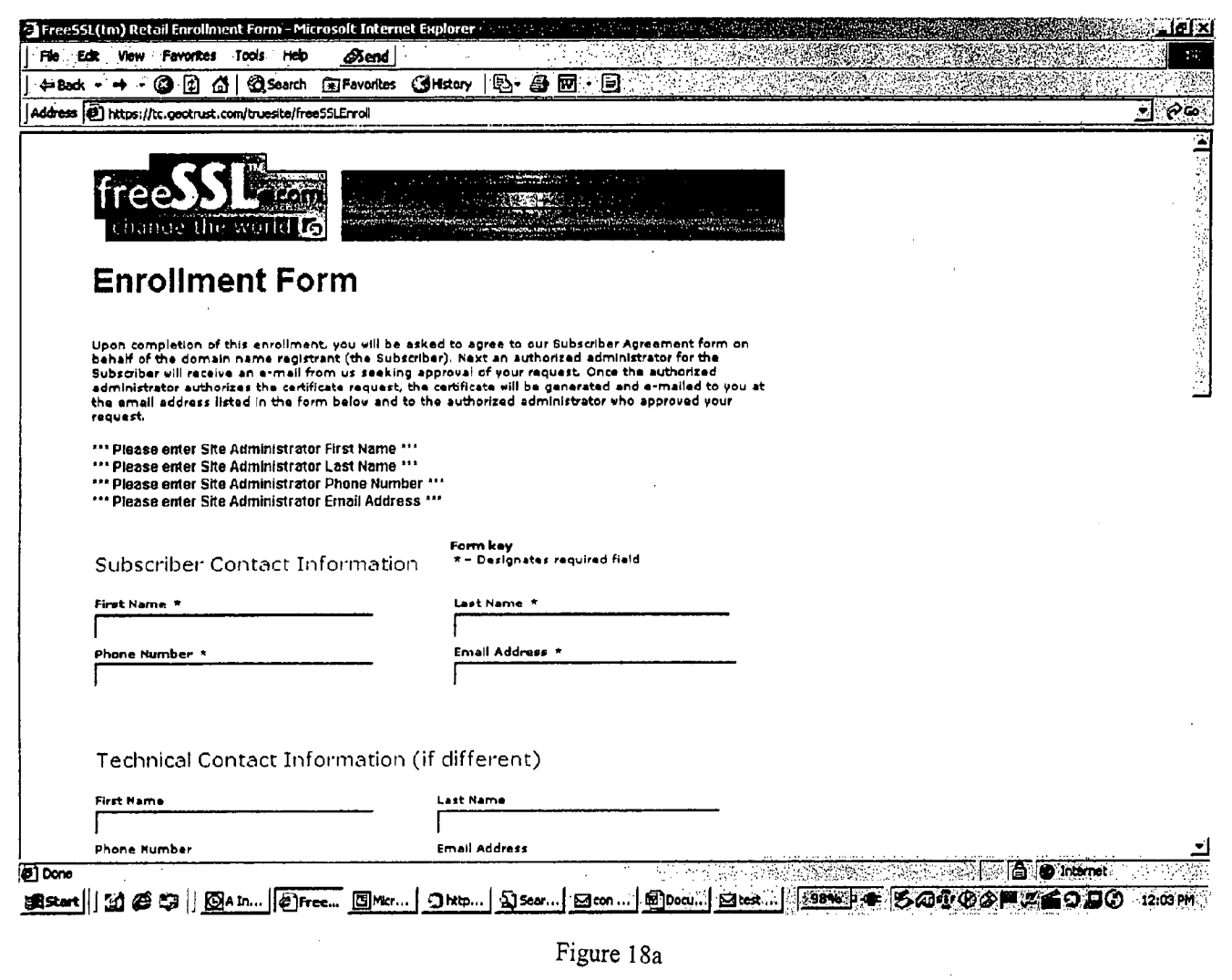
Figure 18B:
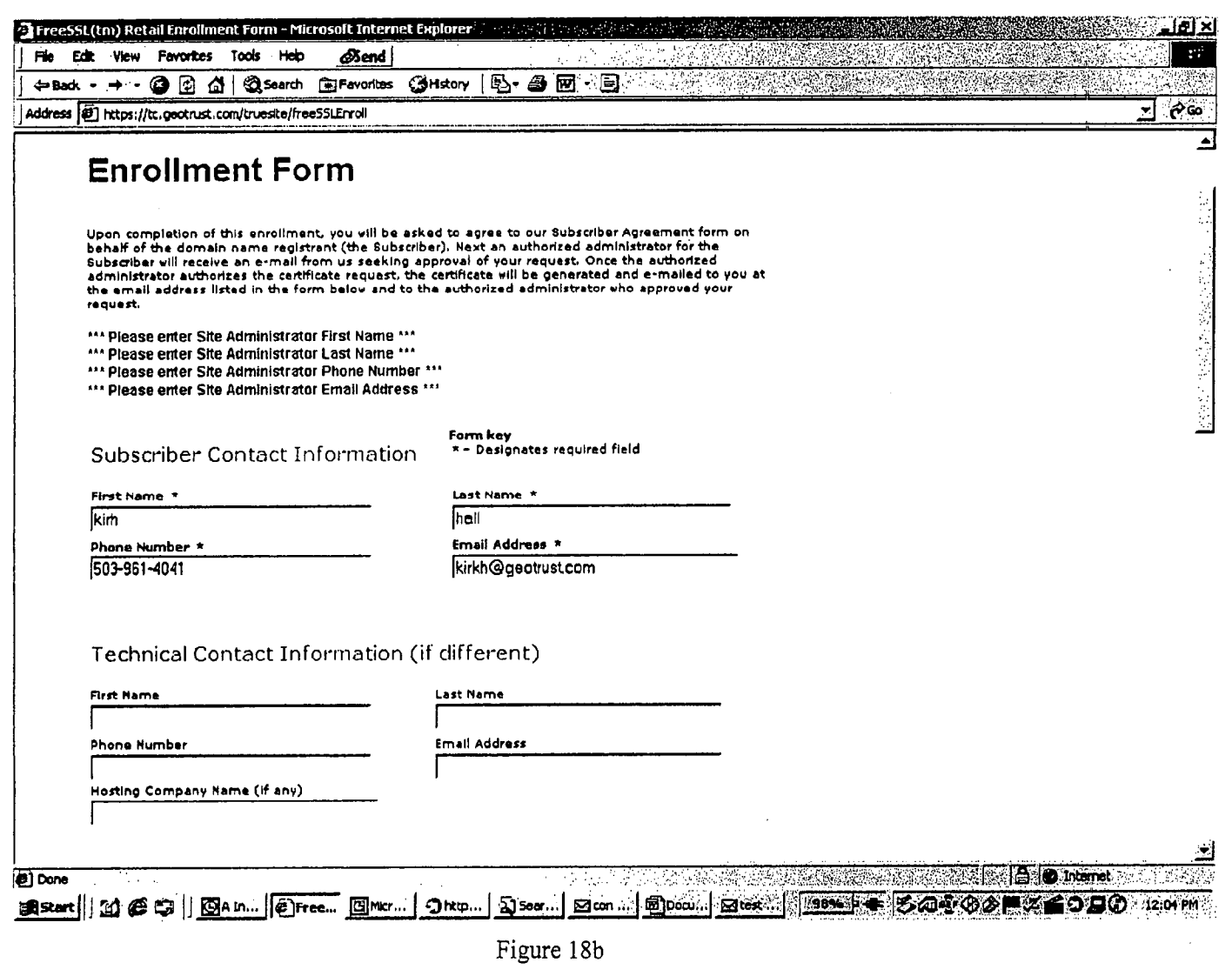

The Enrollment form and other pages in the process are interactive and self-correcting, requiring the Requestor to correct errors and add omitted but necessary information before proceeding. FIGS. 18a and 18b.

After submitting the Enrollment Form, the Requestor is asked to confirm basic information elements extracted from the Form, including information concerning the Requestor's server's fully qualified domain name, organization, organizational unit, city, state, and country that was extracted from the CSR generated by the Requestor and pasted into the form. This data is presented for approval in the exact form that it will be inserted automatically in the SSL server certificate generated by this process and invention. See FIGS. 19a, 19b, 19c and 19d.

The Requestor is also required to select an email address for the official person (the "Approver") associated with the domain name who will be asked to approve the issuance of the certificate with the specific data elements contained in the CSR. See FIGS. 19b, 19c and 19d. In this step of the process, the choices offered in the form for email address for the Approver, the Approver Email Addresses, are limited to those chosen by the Issuer, and cannot be altered or amended by the Requestor. Please note that the Approver Email Address choices offered on this page are not created by the Requestor or entered into the Enrollment Form by the Requestor, and so the Requestor cannot divert or "short circuit" the approval process by directing the email message requesting official approval of the certificate issuance request to the Requestor or to an unauthorized person. This provides a security element of the automated process and invention.

The Approver Email Addresses can be generated or selected according to different algorithms designed for security or other purposes. They may be selected by automated and/or online processes which are also part of the automated process and invention, or they may be selected by off-line processes. As an example, the Approver Email Addresses can be composed some or all of the following data and algorithms: (1) elements created dynamically and automatically from Issuer or third party data sources in response to data or choices made by the Requestor, (2) elements created dynamically and automatically from data submitted by the Requestor, and (3) elements created dynamically and automatically or statically from off-line or pre-set Issuer or other algorithms. It should also be noted that alternately, instant messaging or other such electronic communication means could be implemented in addition to or in place of email technology for this aspect to the present invention.

In this case, as shown in FIGS. 19a, 19b, 19c and 19d, the choice of Approver Email Addresses combines all three features. For this example, the addresses in the screen shots are "billing@PHPWEBHOSTING.COM" and "support@PHPVWEB-HOSTING.COM", which are the official contact email addresses listed for this domain name in the official registries. The two choices in the left column under the heading "Authorized Domain Name Administrators" were generated automatically and dynamically in real time by looking up and recording the official listed email addresses for the Administrative Contact and Technical Contact for the domain name that is contained within the Certificate Signing Request (CSR) as received from the Registrant, as those email addresses are registered for the domain in one of many "WhoIs" domain name registries (the "Official Email Addresses"). The domain name can be read from the Common Name or CN field in the CSR (using X.509 format).

In another embodiment, the Requestor's domain name as entered into an enrollment form and/or as contained in the contact email addresses entered into an enrollment form submitted by the Requestor is compared with the domain name contained in the CN field of the CSR submitted by the Requestor, and the application is rejected if the two names do not match.

In another embodiment, the Requestor's O or OU name(s) (organization and organization unit), L (city), S (state or province), and/or C (country) information contained in the CN field of the CSR submitted by the Requestor is compared with the corresponding data submitted by the Requestor or other data, and the application is rejected if the two names do not match. IN still yet another embodiment the proceeding comparisons are both employed.

These automatic and dynamic features can (1) provide additional protection against fraud or mistake, (2) help ensure that the CSR is only approved by an authorized person associated with the domain name that is the CN of the certificate, and (3) help ensure that the certificate is delivered to persons associated with the domain name that is the CN in the certificate.

The process could also include an automated check of any public or private information source via the Internet or any other communications means, including the Issuer's own data or the data of an official or unofficial third party source, followed by a comparison and decision process (e.g., approval or rejection), and this subprocess could occur at any time in the enrollment and certificate request and issuance process. In accordance with this algorithm, the chance of fraud or error in generation and delivery of the certificate to the wrong party is substantially reduced. In this case, the checking of the Official Email Addresses associated with the domain name contained in the CSR occurs automatically after the Requestor submits the Enrollment Form with the CSR pasted in, and the subsequent Enrollment pages were modified by using the information obtained through that automatic checking of a third party data source.

Figure 19A:
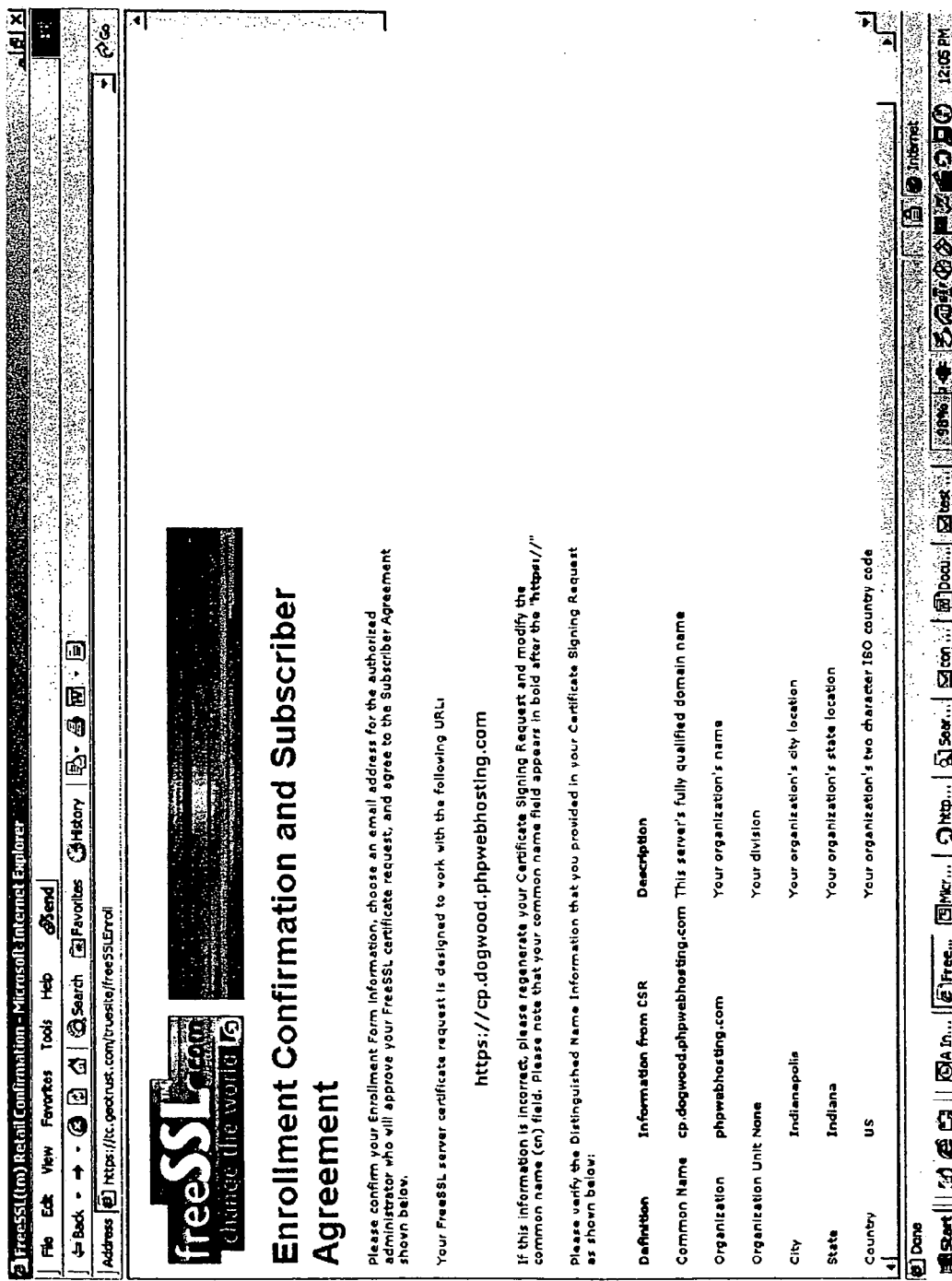
Figure 19B:
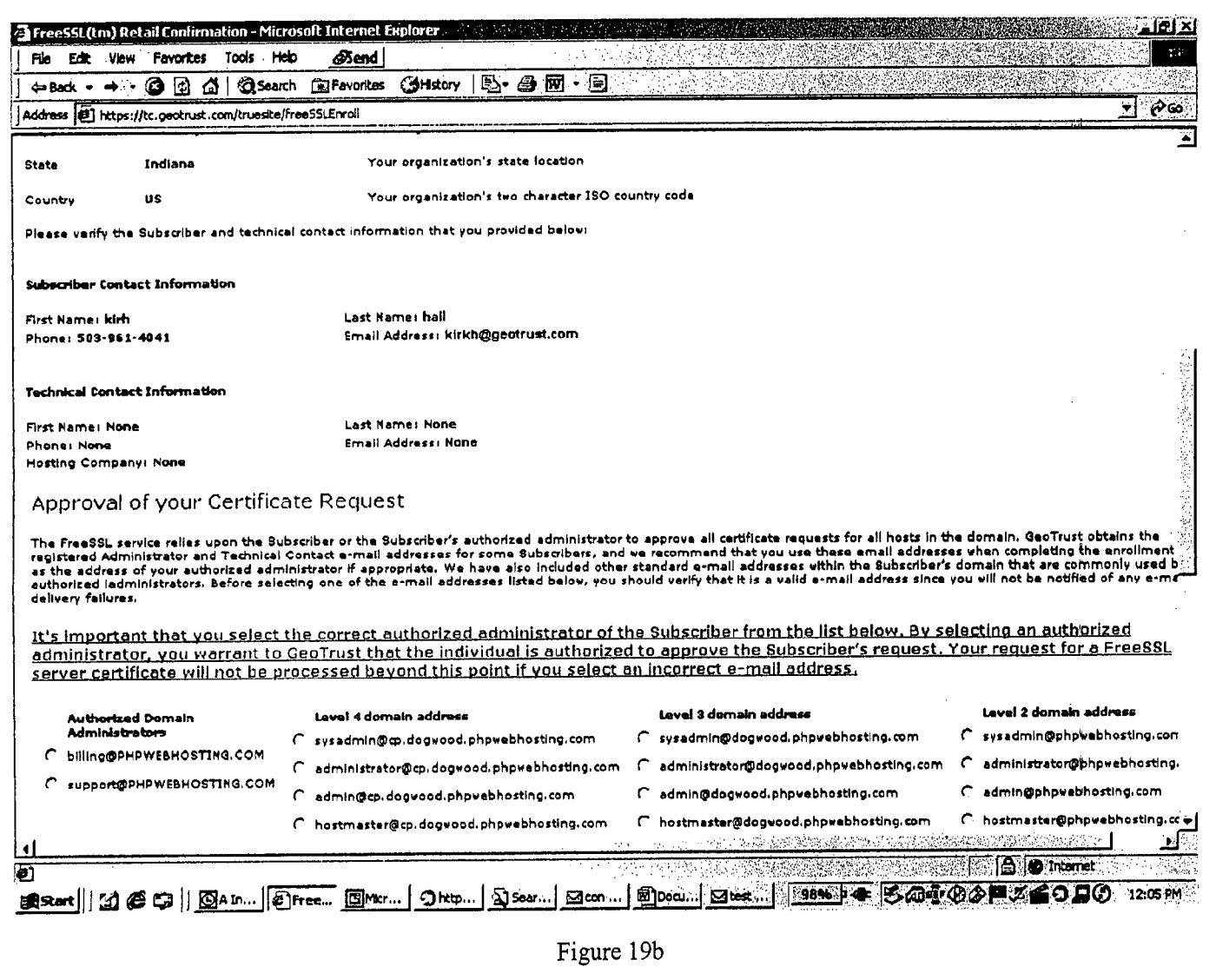
Figure 19D:
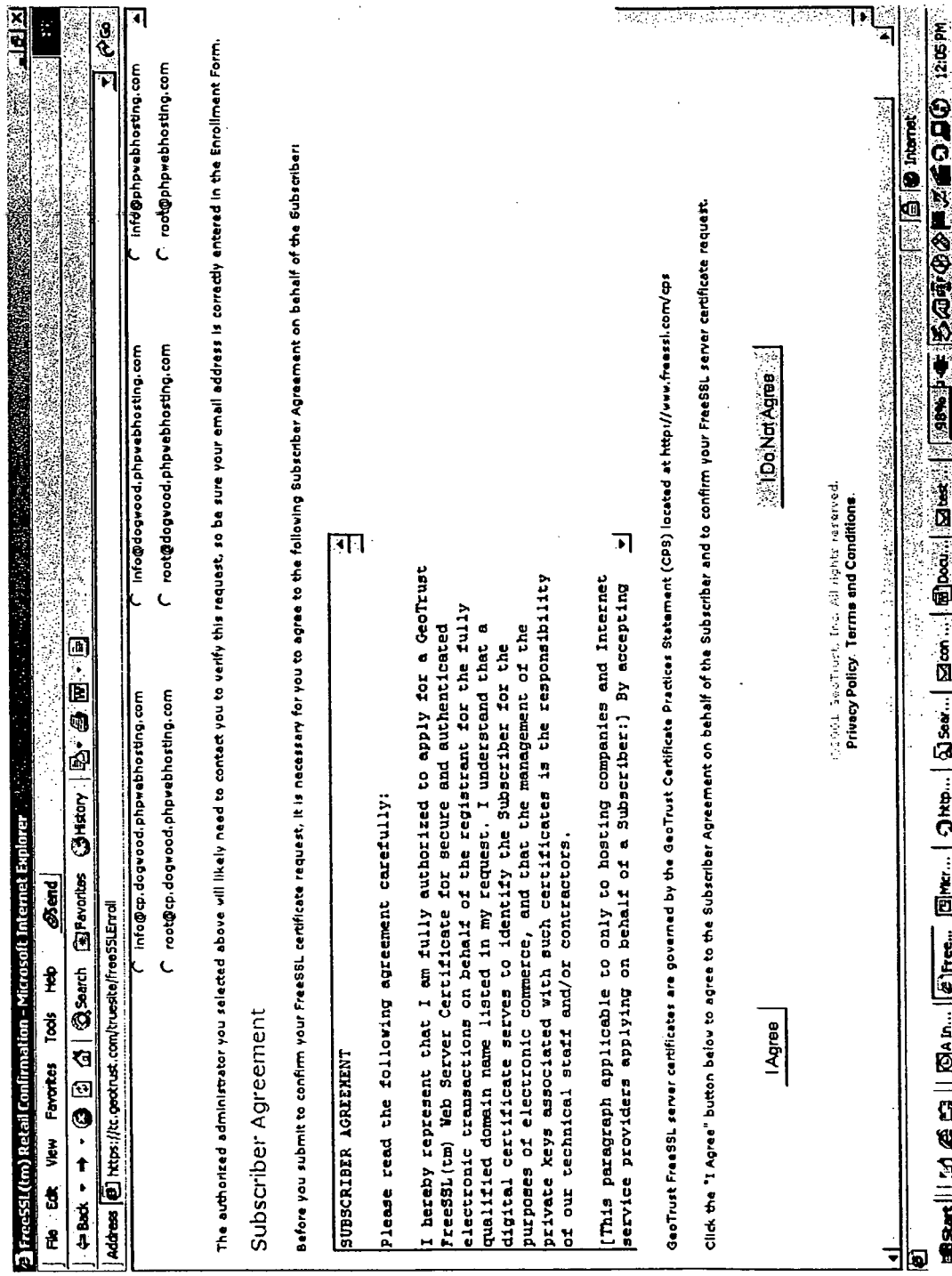

Other Approver Email Address choices are included in three additional columns to the right shown on FIGS. 19b, 19c and 19d. These addresses were selected by the issuer using the other two data and algorithm sources described above: (1) elements created dynamically and automatically from data submitted by the Requestor; and (2) elements created dynamically and automatically or statically from off-line or pre-set Issuer or other algorithms. In this case, the Approver Email Addresses listed in the three columns to the right on FIGS. 19b, 19c and 19d include: (1) the Level 4 domain name contained in the CSR (i.e., elements created dynamically and automatically from data submitted by the Requestor) and (2) prefixes consisting of the most commonly-used official email contact addresses for domain names (i.e., elements created dynamically and automatically or statically from off-line or pre-set Issuer or other algorithms). These alternatives are offered in case the Requestor (which may include a hosting company or Internet service provider, as described above) wishes to choose a different Approver Email Address from those dynamically generated based on the official domain name registry information (for example, because the domain name registrant has delegated the upkeep and operation of the associated Web site to the hosting company or Internet service provider, who is applying for the certificate on the domain name registrant's behalf).

In other circumstances, the Approver Email Address choices could be composed of all three of the data and algorithms sources described above, or any combination thereof, or any other relevant sources.

As shown in FIG. 19d, the Requestor in this embodiment is required to agree to a Requestor Agreement with the Issuer before the process can continue. Clicking "I Agree" triggers the next step.

Figure 20:
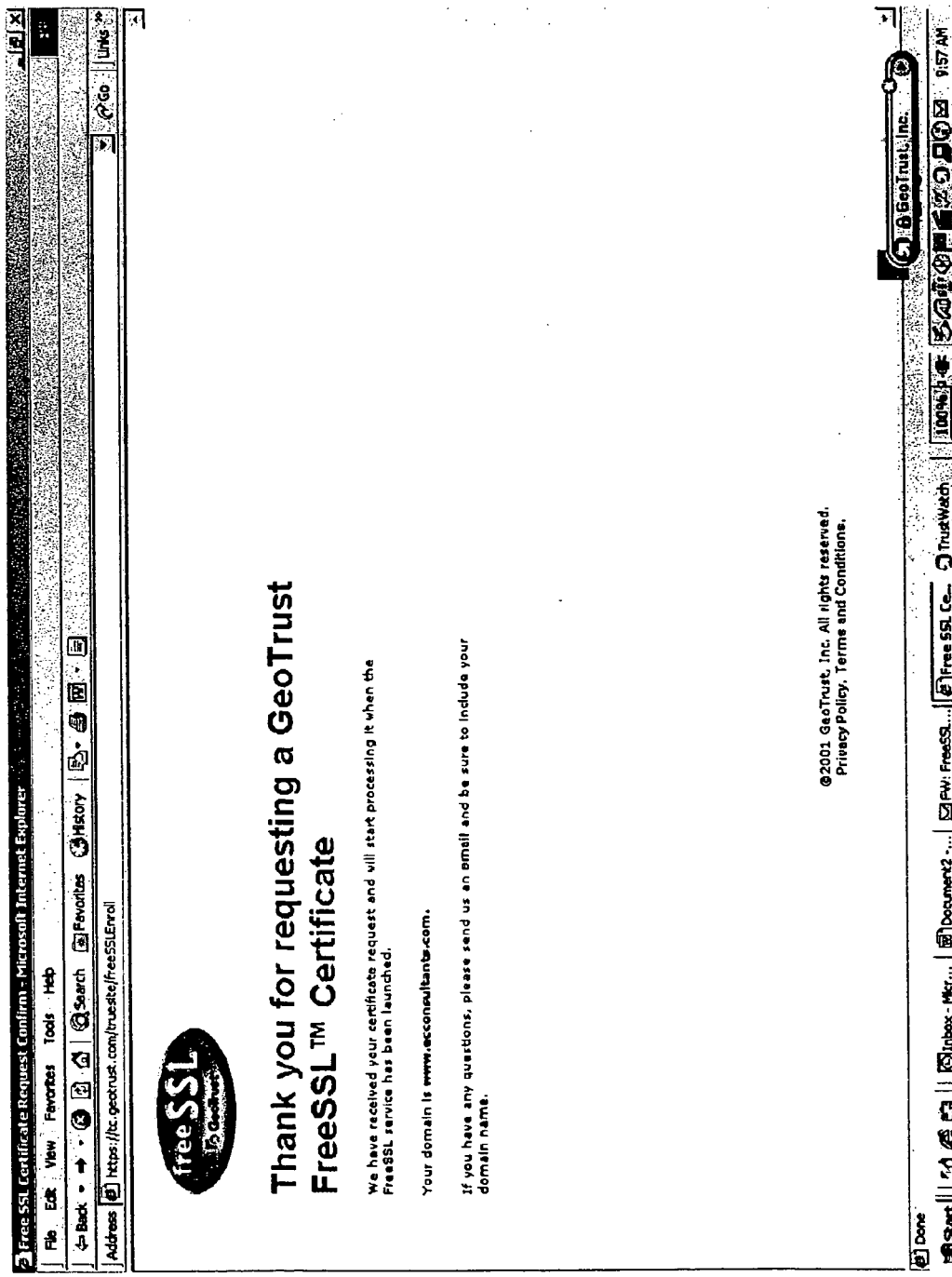
FIG. 20 shows the automatic response back to the Requestor (Subscriber) who has submitted the completed certificate request properly in accordance with a second embodiment of the present invention.
Figure 21:
FIG. 21 shows a version of the email message the Approver receives requesting approval of the certificate request from the Requestor (Subscriber) in accordance with a second embodiment of the present invention.

FIG. 20 shows an automatic response back to the Requestor who has submitted the completed certificate request properly, and includes instructions for further communications. FIG. 21 shows a version of the email message the Approver receives requesting approval of the certificate request from the Requestor. It contains a hyperlink taking the Approver to the Issuer's approval site. Because of the invention features described in connection with FIGS. 19a, 19b, 19c and 19d above, this message and link to an approval page can only go to one of the Approver Email Addresses offered by the Issuer based on the selected algorithms.

Figure 22:
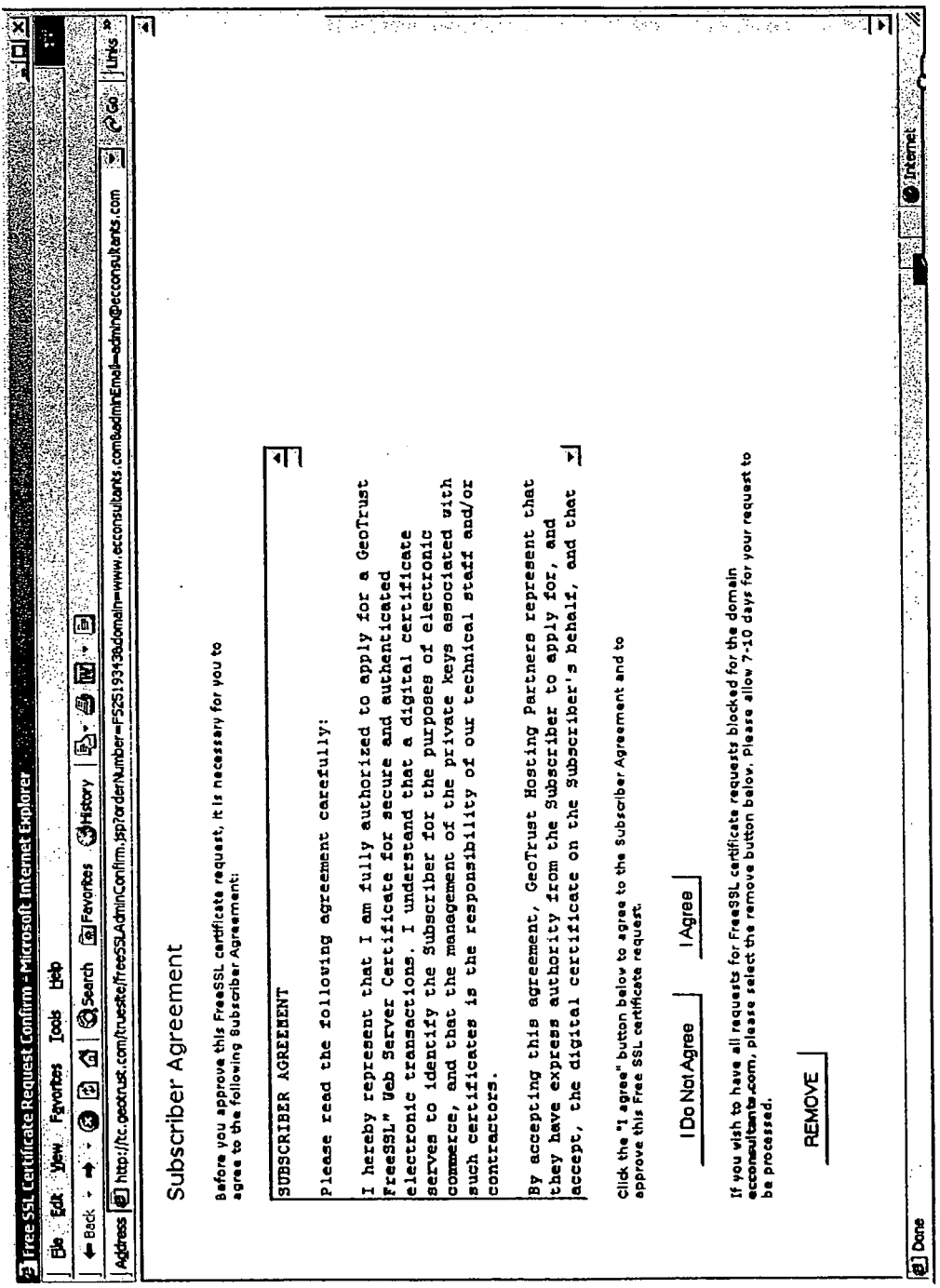
FIG. 22 shows information, terms and conditions, and agreements for the Approver to agree to in approving or disapproving the certificate request in accordance with a second embodiment of the present invention.

The Issuer's approval site may contain additional information, terms and conditions, and agreements for the Approver to agree to, or may simply contain a button, or other mechanism, allowing the Approver to approve or disapprove the certificate request. Because of the invention features described in connection with FIGS. 19a, 19b, 19c and 19d above, this approval step can only be taken by an individual associated with one of the Approver Email Addresses offered by the Issuer based on the selected algorithms, thereby enhancing authenticity and security in the certificate issuance process. See FIG. 22.

Figure 23:
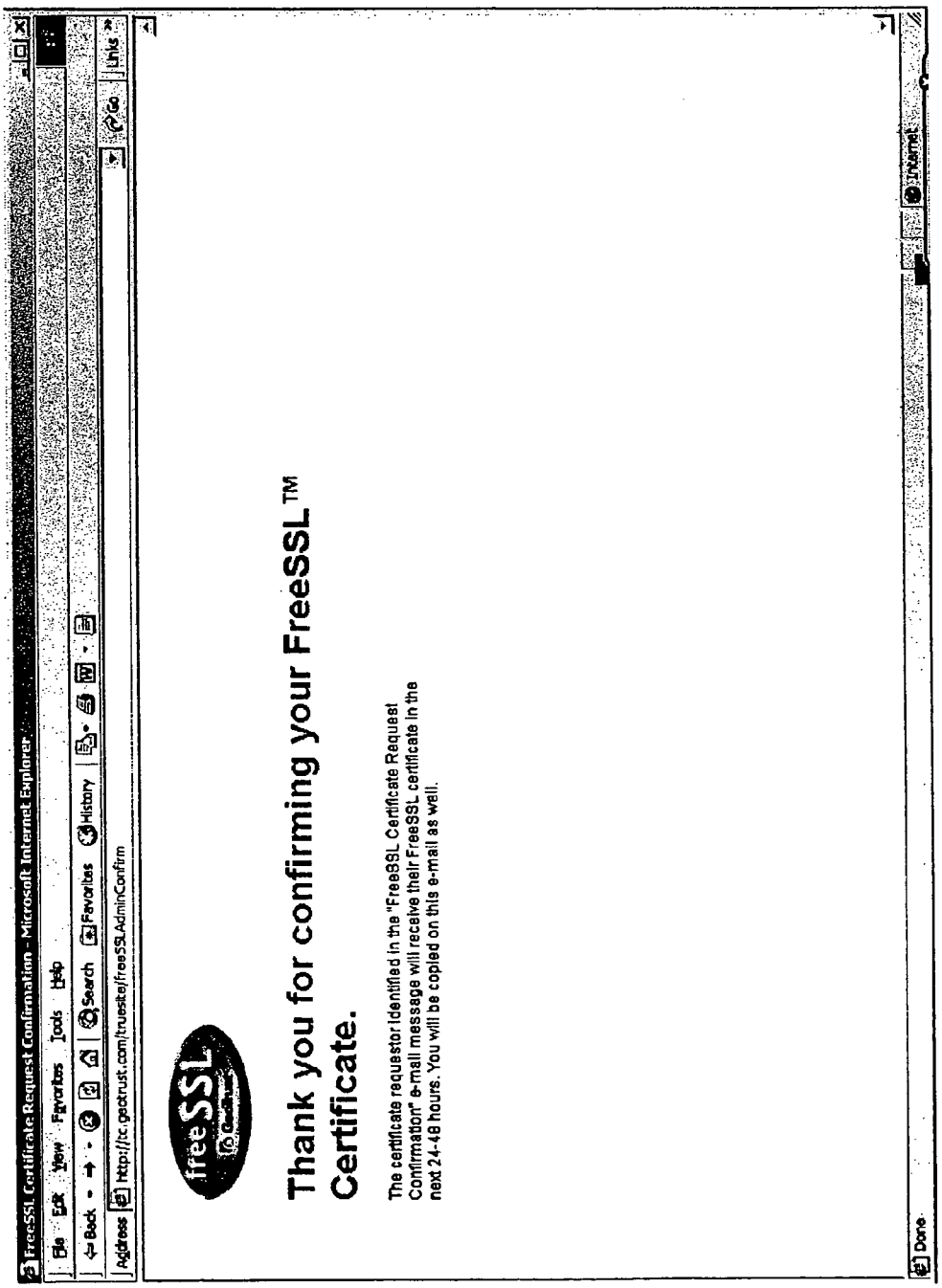
FIG. 23 shows an automated notice confirming the approval of the certificate request in accordance with a second embodiment of the present invention.

If the Approver approves the request, the Approver (and others, such as the other contact persons listed in the original Enrollment Form) receives an automated notice confirming the approval. See FIG. 23. Because of the invention features described in connection with FIGS. 19a, 19b, 19c and 19d above, this approval message will necessarily be sent to an individual associated with one of the Approver Email Addresses offered by the Issuer based on the selected algorithms, thereby enhancing authenticity and security in the certificate issuance process.

If the Approver approves the certificate request, the Issuer's Certificate Authority automatically and dynamically generates the certificate and sends it by email to the Approver (and others, in accordance with the particular embodiment, such as the other contact persons listed in the original Enrollment Form). See FIG. 24.

Figure 24:
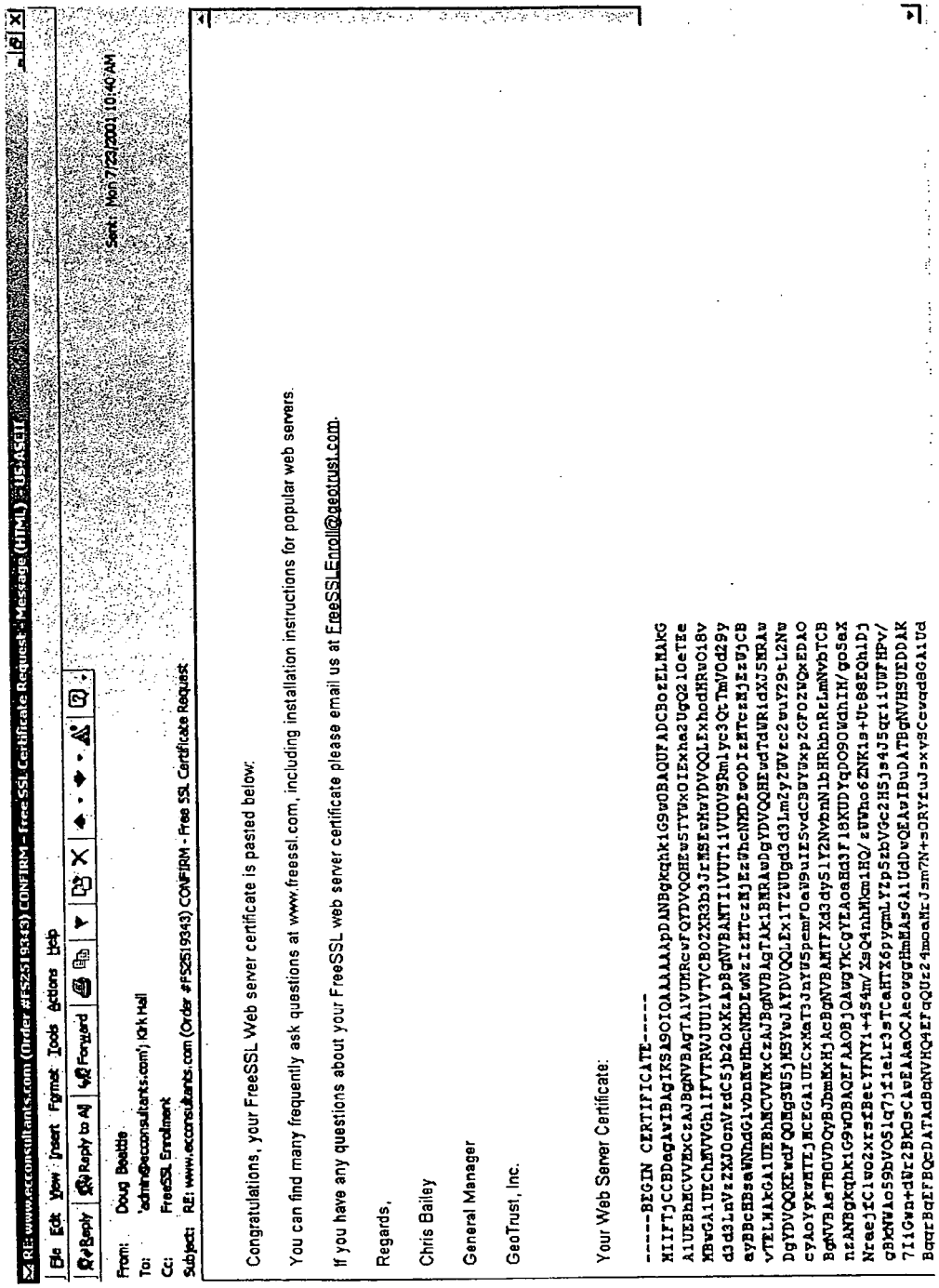
FIG. 24 shows the web server certificate as issued in an email after approval in accordance with a second embodiment of the present invention.

A sample automated message transmitting the digital certificate is shown as FIG. 24. The message may also contain instructions or hyperlinks to instructions for installation. Because of the invention features described in connection with FIGS. 19a, 19b, 19c and 19d above, a copy of this certificate transmittal message will necessarily be sent to an individual associated with one of the Approver Email Addresses offered by the Issuer based on the selected algorithms, thereby enhancing authenticity and security in the certificate issuance process.

Figure 25:
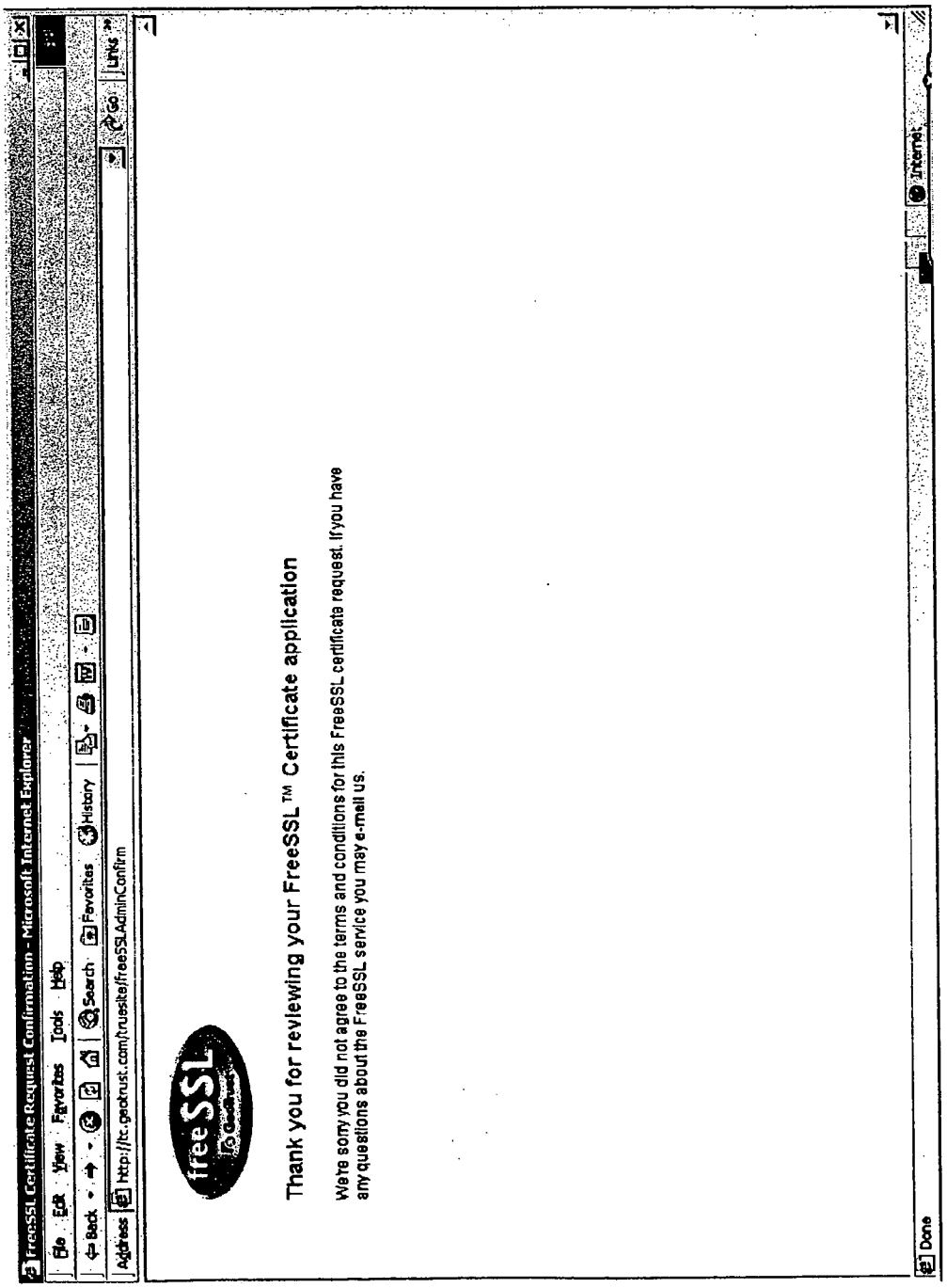
FIG. 25 shows an automated notice confirming the disapproval by the Approver in accordance with a second embodiment of the present invention.
Figure 26:
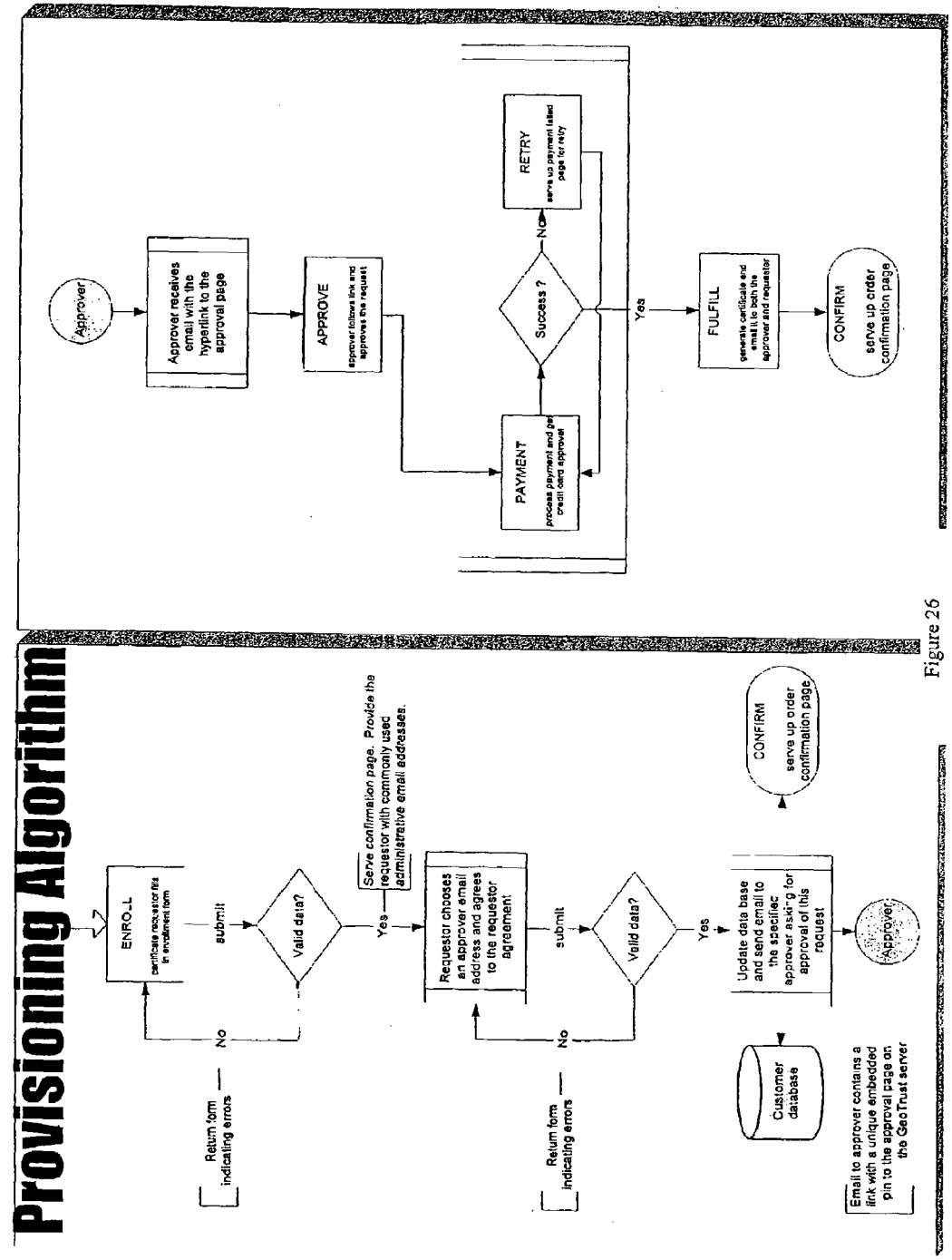
FIG. 26 shows a provisioning algorithm in accordance with a second embodiment of the present invention.
Figure 27:
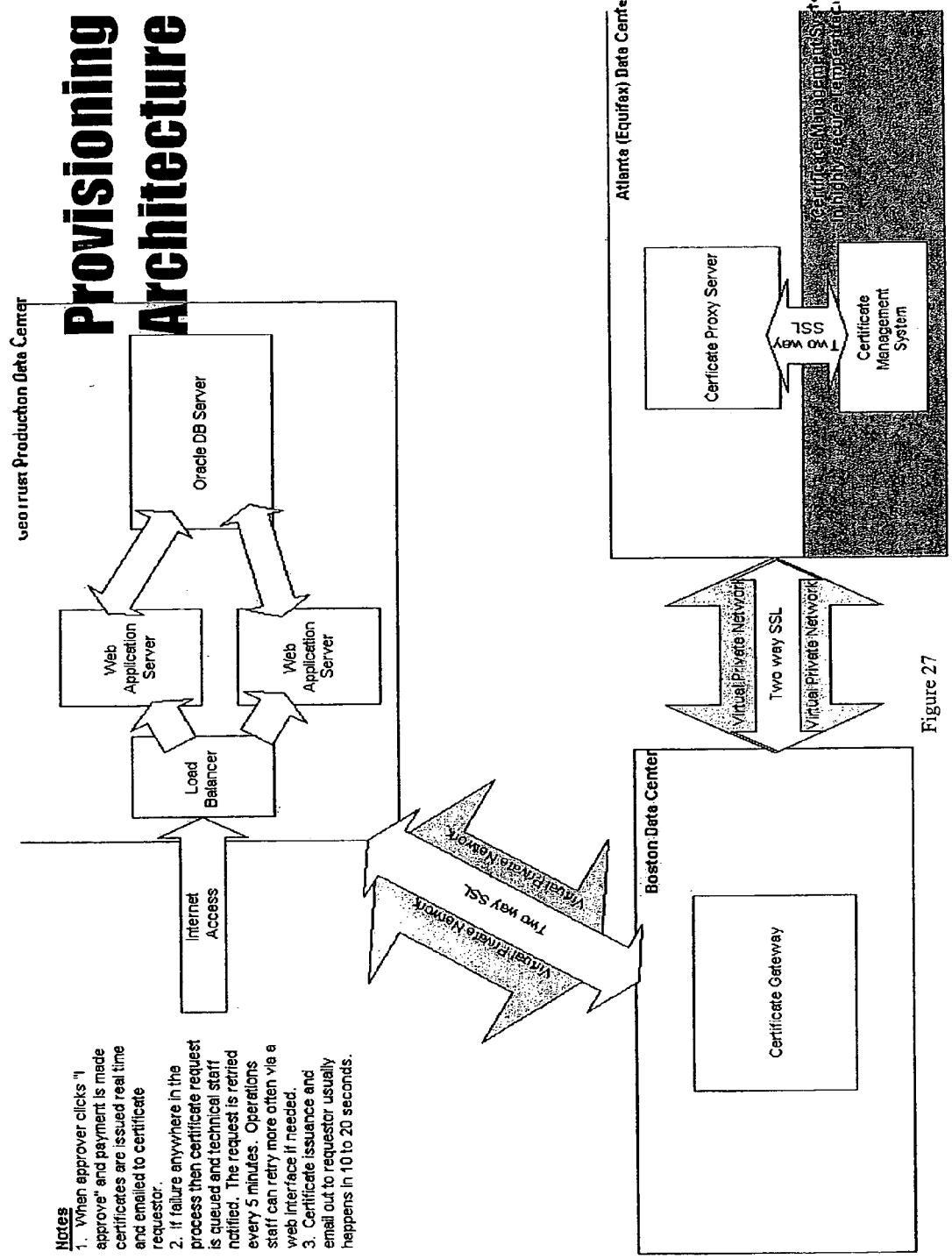
FIG. 27 shows a provisioning architecture in accordance with a second embodiment of the present invention.

If the Approver disapproves the request, the Approver (and others, such as the other contact persons listed in the original Enrollment Form) receives an automated notice confirming the disapproval. See FIG. 25. Because of the invention features described in connection with FIGS. 19a, 19b, 19c and 19d above, this disapproval message will necessarily be sent to an individual associated with one of the Approver Email Addresses offered by the Issuer based on the selected algorithms, thereby enhancing authenticity and security in the certificate issuance process. In the process described in FIGS. 23, 24 and 25, if the Approver rejects the request, they can not later approve it. If they approve it, they can not later reject it. The state is changed.

Additional Embodiments

Alternative process feature: The Enrollment Form can request payment information (e.g., credit card information) from the Requestor, and the process can automatically and dynamically check for payment authorization and post the charge upon approval of the certificate request by the Approver. As a further alternative, information gained through the automatic payment process can be used for comparison and/or verification of other information contained in the Enrollment Form and/or CSR, and further process decisioning (e.g., accept or reject) can be based on specific algorithms.

Having now described preferred embodiments of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, and equivalents or similar purpose, unless expressly stated otherwise. Therefore, numerous other embodiments of the modifications thereof are contemplated as falling within the scope of the present invention as defined by the appended claims and equivalents thereto.

For example, the techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device and one or more output devices. Program code is applied to data entered using the input device to perform the functions described and to generate output information. The output information is applied to one or more output devices.

Each program is preferably implemented in a high level procedural or object oriented programming language to communicate with a computer system, however, the programs can be implemented in assembly or machine language or other computer language, if desired. In any case, the language may be a compiled or interpreted language.

Still Additional Embodiments of the Present Invention

In another embodiment of the present invention the Requestor may engage a partner of the CA to assist in obtaining the certificate for the Requestor. The partner may perform varying levels of the ordering process workflow.

A telephone verification step could be added to the process where by the person requesting the certificate, or the Approver are called via a computer program and asked to enter some information that is displayed on the web browser. The intent of this is to collect another verified piece of information—the phone number (in addition to the Approver e-mail address) to reduce risk and improve security while at the same time making this an automated, quick process. The person called may be requested to say something that is then recorded by the system. This voice print can be used later to verify user identity if needed (for example, by law enforcement). At the very least, a voice recording further inhibits attempts at fraud.

For example, when the Requestor gets to the order summary page and presses confirm a new page is displayed with a code (PIN) on it and some instructions. They are asked to be ready for a phone call at the specified phone number (entered as part of the contact information earlier, or from a corporate data registry (DUNS or similar), or from the WhoIs server data, or other sources). They agree, then the system calls them and asks them to enter the PIN into the phone when prompted. They are also asked to say their name and other information which is recorded for later use. The phone system passes this PIN back to the enrollment engine where the values are compared. If successful, the system has verified that the Requestor is at the particular phone number and this creates a better audit trail for finding this person later and reduces the risk of fraud.

If the Approver is the individual to be called (as opposed to the Requestor as described above), the phone call would be performed after they receive their Approver e-mail, come to the Approver site, review the order and press the Approve button. At that point the system would call them and perform the verification. If successful, the system would then issue the certificate.

Another embodiment of the present invention would also employ corporate registration data. A record for each order/company in a public registration database would be created or accessed with a globally unique identifier with user disclosed information about them or their company—much like DUNs numbers today (www.dnb.com). This is currently a perceived important aspect of traditional vetting where companies are highly encouraged to get a DUNs number by self-reporting some information about the company. This would preferably be a globally unique ID that can be used to track the certificate back to some additional identifying profile information.

This profile data would be linked to and from the certificate (which would have the number included, and probably the URL to the data), and perhaps elsewhere at the CA. Users would be able to opt-out of this data being published if they desired. The CA would collect the information, post to this repository, create or obtain the globally unique number, and include it in the certificate for the user. Currently users need to go and do this prior to requesting the certificate, so this is a quicker, easier process. Finally, if users have a number already, they can enter it during enrollment and the CA would link to that previously registered entity.

Use of DNS server ownership for verifying domain-control. In the case a CA partner is hosting the Requestor's web site, such service normally includes entering and maintaining the DNS entry. This is a mapping between the domain name and the IP address where the server actually resides. Every web connection made by a browser looks up the domain name in a DNS server, obtains the IP address, and then connects to that IP address. If an entity has has control over the DNS server for this domain, it has control over the domain.

If a request for a certified for domain name "domain.com" is from a partner (Partner A), the CA can do a DNS look-up and find the authoritative DNS server for this domain. The CA can compare this with the list of DNS servers registered with us for Partner A. If they match, the CA can automatically approve the request, generate the certificate and e-mail to the requester, tech, billing and Partner A registered contact, or send an approval e-mail to a previously registered e-mail address for Partner A. As before, it should also be noted that alternately, instant messaging or other such electronic communication means could be implemented in addition to or in place of email technology for this aspect to the present invention.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner. For illustrative purposes the present invention is embodied in the system configuration, method of operation and product or computer-readable medium, such as floppy disks, conventional hard disks, CD-ROMS, Flash ROMS, nonvolatile ROM, RAM and any other equivalent computer memory device. It will be appreciated that the system, method of operation and product may vary as to the details of its configuration and operation without departing from the basic concepts disclosed herein.

We claim:

1. A method for automated processing of digital certificates, comprising the steps of:
   automatically vetting an entity where a digital certificate is to be used; and
   generating at least one approver e-mail address that indicates an association with the entity, the e-mail address for use in contacting an approver with information for the approver to approve the digital certificate.

2. The method according to claim 1, wherein the entity is an internet domain name.

3. The method according to claim 1, wherein the entity is an IP address.

4. The method according to claim 1, wherein a requestor selects one e-mail address from a plurality of generated approver e-mail addresses.

5. The method according to claim 1, wherein a system for contacting the approver has approver contact information including approver e-mail address information.

6. The method according to claim 1, wherein at least one approver e-mail address is generated by appending a mail box identifier to the domain of an internet site for which a digital certificate is requested.

7. The method of claim 1, wherein the vetting is in response to a request received from a domain name registrant for using a secure socket layer (SSL) server certificate on the domain name site.

8. The method of claim 1, wherein the vetting is done in response to a request received from a hosting company acting on behalf of a domain name registrant.

9. The method of claim 1, wherein the vetting is performed by a server.

10. The method of claim 1, wherein the vetting includes accessing information from a domain registrar database.

11. The method of claim 1 further comprising:
a requestor submitting a request for a digital certificate to a certificate authority;
the certificate authority identifying at least one approver to approve issuance of the digital certificate;
the certificate authority contacting the approver to obtain approval for issuance of the digital certificate to the requestor,
the certificate authority receiving a response from the approver; and
the certificate authority issuing a digital certificate upon receipt of approval from the approver.

12. The method according to claim 11, wherein the issuing of the certificate is performed with a microprocessor.

13. The method according to claim 11, wherein the automatic vetting includes the certificate authority obtaining information about the requestor from a domain registrar.

14. The method according to claim 13, wherein the information obtained from the domain registrar is used by the certificate authority to identify the approver.

15. The method according to claim 11, wherein the identifying of the at least one approver includes generating an approver list, and further comprising:
providing the approver list to the requestor; and
the requestor selecting an approver for the certificate authority to contact from the approver list.

16. The method according to claim 15, wherein the approver list includes contact information for each approver, including an e-mail address.

17. The method according to claim 11, wherein the digital certificate is requested for a server.

18. The method according to claim 17, wherein the server is a web server.

19. The method of claim 11, wherein the submitting by the requestor includes submitting a certificate signing request (CSR).

20. The method of claim 1, wherein the digital certificate is for a domain name.

21. The method of claim 20, wherein the generating includes generating a plurality of e-mail addresses, each indicating an association with the domain name.

22. The method of claim 21, wherein each of the plurality of e-mail addresses includes an alias and the domain name.

23. The method of claim 22, wherein the set of aliases for a domain name includes one or more of the following: webmaster@domain_name; administrator@domain_name; admin@domain_name; info@domain_name; sysadmin@domain_name; and hostmaster@domain_name; wherein "domain_name" is the name of the domain name.

24. The method of claim 22, wherein the set of aliases for a domain name includes all of the following: webmaster@domain_name; administrator@domain_name; admin@domain_name; info@domain_name; sysadmin@domain_name; and hostmaster@domain_name; wherein "domain_name" is the name of the domain name.

25. The method of claim 1, wherein the vetting includes vetting without accessing information from a secretary of state or from credit report providers.

26. The method of claim 25, wherein the vetting includes accessing information from a domain registrar database.

* * * * *